US006737639B2

(12) United States Patent
Huniu

(10) Patent No.: US 6,737,639 B2
(45) Date of Patent: May 18, 2004

(54) DISPLAY UNIFORMITY CALIBRATION SYSTEM AND METHOD FOR A STARING FORWARD LOOKING INFRARED SENSOR

(75) Inventor: Lee J. Huniu, Torrance, CA (US)

(73) Assignee: Raytheon Company, Waltham, MA (US)

( * ) Notice: Subject to any disclaimer, the term of this patent is extended or adjusted under 35 U.S.C. 154(b) by 118 days.

(21) Appl. No.: 10/108,710

(22) Filed: Mar. 27, 2002

(65) Prior Publication Data

US 2003/0183756 A1 Oct. 2, 2003

(51) Int. Cl.$^7$ .............................................. G01D 18/00
(52) U.S. Cl. ..................... 250/252.1; 250/332
(58) Field of Search ............... 250/252.1, 332, 250/352

(56) References Cited

U.S. PATENT DOCUMENTS

| | | | |
|---|---|---|---|
| 5,118,943 A | | 6/1992 | Le Bars et al. |
| 5,420,421 A | * | 5/1995 | Lindgren et al. ......... 250/252.1 |
| 5,563,405 A | * | 10/1996 | Woolaway, II et al. .. 250/208.1 |
| 5,693,940 A | | 12/1997 | Botti et al. |
| 5,920,066 A | * | 7/1999 | DiRenzo et al. ......... 250/252.1 |
| 6,127,679 A | | 10/2000 | Ashley et al. |
| 6,255,650 B1 | * | 7/2001 | Warner et al. .............. 250/330 |
| 6,373,050 B1 | * | 4/2002 | Pain et al. ................. 250/330 |
| 6,433,333 B1 | * | 8/2002 | Howard .................... 250/252.1 |
| 6,465,785 B1 | * | 10/2002 | McManus ................. 250/338.1 |
| 6,476,392 B1 | * | 11/2002 | Kaufman et al. .......... 250/332 |
| 6,515,285 B1 | * | 2/2003 | Marshall et al. ............ 250/352 |
| 6,610,984 B2 | * | 8/2003 | Knauth et al. .............. 250/352 |

* cited by examiner

Primary Examiner—Albert Gagliardi
(74) Attorney, Agent, or Firm—John E. Gunther; Leonard A. Alkov; Glenn H. Lenzen, Jr.

(57) ABSTRACT

A method and system for maintaining uniformity in a FLIR display. During a one-time initialization procedure, a plurality of dynamic ranges are defined by covering a specific range of bucket fill levels when in a certain gain. To cover all dynamic ranges possible, a plurality of pairs of responsivity equalization (RE) calibrations (each pair producing a RE set of pixel gain corrections) are also accomplished in the same one time initialization period. A plurality of corresponding level equalization (LE) calibrations (each using the appropriate calibrated RE set and producing a LE set of pixel level corrections) for each anticipated dynamic range are made at every power-up initialization. Each of the calibrations is done with respect to a thermal reference source to produce a uniform scene at the desired bucket fill level. An algorithm is employed which forces the two bucket fill points defined during the responsivity calibration to span as far as possible the dynamic range and forces the level equalization bucket fill point to fall within the two bucket fill points of the responsivity calibration. Then, during an operational time period, the scene and optics temperatures are monitored, and if the average bucket fill value exceeds the bucket fill range of the present dynamic range, the presently selected dynamic range is changed to a second dynamic range (gain is changed along with the RE set and LE set). The dynamic ranges are designed to overlap so that a hysteresis effect is achieved. The pre-calibrations and automatic dynamic range switching prevent saturation and create the best uniformity (lowest fix pattern noise) possible while allowing for continuous operation of the FLIR system, thus eliminating the interruption caused by the prior art touch-up calibration procedure.

9 Claims, 4 Drawing Sheets

DISPLAY UNIFORMITY CALIBRATION SYSTEM AND METHOD FOR A STARING FORWARD LOOKING INFRARED SENSOR

BACKGROUND OF THE INVENTION

1. Field of the Invention

The present invention relates to infrared detection systems. More specifically, the present invention relates to systems and methods for providing dynamic range control and non-uniformity calibration of staring infrared imaging systems.

2. Description of the Related Art

Infrared imaging systems have achieved a wide level of deployment in industrial, commercial and military applications. The leading edge of technological development has typically been in the military arena as the ability to generate infrared images has many advantages in both tactical and strategic applications. This is particularly true in airborne systems.

Forward looking infrared (hereinafter "FLIR") systems have been used in airborne applications for many years. Such systems typically employ a focal plane array ("FPA") of infrared image sensing pixels that are coupled with an optical system which views a scene through an entrance pupil of the FLIR system. The FPA is typically housed within a cooled dewar vessel that serves to reduce thermal noise and improve the signal to noise ratio of the system. Infrared energy from a viewed scene is directed to and focused on the FPA through an optical system that may include both refractive and reflective optical components. The optical components in the FLIR system are located between the entrance pupil and a cold aperture of the dewar. Thus, the optical system operates at ambient temperatures that may fluctuate during operation of the FLIR system. Therefore, the optical components themselves are a source of noise to the FLIR systems.

Another limitation on the optical performance of a typical FLIR system is due to the fact that the optical components do not have perfect transmissivity.

As infrared energy is incident upon the FPA, it is integrated over time to produce frames of a video image. In a typical application, with real-time video performance, integration times are on the order of 10 to 20 milliseconds. The video frames generated are conditioned and provided to a video display for viewing by the operator of the FLIR system. The output of each pixel of the FPA is an analog signal proportional to the amount of light energy incident upon that pixel over the integration time period. For a variety of reasons, the output signals from all the pixels in the FPA are not identical, even given a uniform scene.

In typical applications, the analog signal output from the FPA are digitized and changed to a standard video format, such as the EIA RS-170 video standard. One of the principle functions of the FLIR system is to provide a detailed display of the infrared energy emitted from a scene to the pilot. The range of infrared energy levels emitted is very large. These energy levels can be thought of as visible light brightness, especially at the point where the pixel appears on the FLIR display screen for viewing. For example, a FLIR system could be directed to view the ground scene on a cold winter night at northern latitudes where the ground temperature is below zero degrees Fahrenheit. As an alternative, the scene could be a hot desert with battlefield emissions sources, such as fire and explosions. Since staring sensors are DC coupled devices which monitor infrared energy levels (photon flux) varying exponentially with temperature, it should be appreciated that given a range of sensor output levels as they are correlated to scene energy levels, there are problems and opportunities to adjust the sensor dynamic range to accommodate the scene's dynamic range. Sensor inputs that are too low result in noisy output while inputs that exceed the sensor's dynamic range result in saturated video.

It is known in the art to employ multiple dynamic range maps between ranges of scene infrared energy levels to the sensor levels. Sensor brightness levels are referred to as "bucket fill" levels by those skilled in the art. Bucket fill level, or 'BF' for short, is defined herein as the ratio of the sensor's digital output (digitized but not yet processed as video) to the maximum digital output of an analog-to-digital converter. For example, in a relatively warm environment, a first range of bucket fill (BF) values will be mapped to a range of scene energy levels. On the other hand, in the case of a relatively cool scene, a lower range of bucket fill (BF) levels are mapped to scene energy.

Changing the dynamic range of the sensor is equivalent to changing the gain (a combination of gain state and/or integration time) and will result in a remapping of BF for the scene. If one switches the sensor to a lower dynamic range (higher gain) while viewing the relatively cool scene, then the BF will rise in proportion to the gain.

In another aspect of prior FLIR systems, it is understood that the FPA sensor array and related control circuitry and sensor circuitry must be calibrated in order to assign correction factors for pixel to pixel responsivity equalization, and pixel to pixel level equalization. Responsivity is defined as gain and is usually expressed in delta mV of sensor output for a 1 Kelvin change in scene temperature (assuming blackbody scene).

As noted above, given a change in uniform scene energy level, not every pixel in the FPA will yield the same change in output signal level. This discrepancy is corrected for during calibration by directing the entrance pupil of the FLIR system toward a uniform thermal body (known to the art as a thermal reference source "TRS") and then calibrating the pixel to pixel responsivity using a responsivity equalization ("RE") process. This operation is typically accomplished using specialized hardware adapted to this particular function. The RE calibration is a two-point calibration because gain must be calculated by looking at the difference of two uniform scenes- first near the lower temperature/BF limit of the dynamic range, and a second near the higher temperature/BF limit of the dynamic range. Having this calibration and given a uniform change in scene temperature, the change in sensor brightness levels will be the same for all pixels. The resultant RE set of correction coefficients are gain multipliers for each pixel. One RE set may be used to cover multiple dynamic ranges.

The responsivity equalization eliminates the detector cold shield effect (center pixels will be: brighter without this calibration) as well as FPA pixel to pixel gain variation.

In addition to the RE calibration, typically pixel to pixel level equalization ("LE") calibration is employed for each dynamic range. The LE serves to equalize the level factor applied to each pixel in the FPA, and this function is also provided by specialized hardware, and requires that the entrance pupil of the FLIR system be directed to the TRS so that a scene of uniform energy emission is to be viewed during the calibration process. The appropriate RE set for the dynamic range must be used during LE calibration and the TRS temperature must be adjusted to achieve a BF between the high and low BF values of the RE calibration (which produces the RE set being used). A single LE calibration for each dynamic range is typically employed. The resultant LE set of coefficients are level adders for each pixel. The level equalization is required to eliminate fixed patterns created by the optics as well as FPA pixel to pixel level variation. The combination of RE and LE calibrations are required to achieve good uniformity for uniform scenes that (in combination with the optics temperature) produce BF values between the low and high BF values of the RE calibration.

During the course of operation of a FLIR system, even though the system may have been calibrated prior to operation, the scene and/or optics temperature can change. The change frequently pushes toward a bucket fill limit of the previously selected dynamic range, and it therefore becomes necessary to change the sensor's dynamic range (i.e., change detector gain equally across all pixels) so that the scene is properly mapped to the sensor output (i.e., not too low to prevent noisy video and not too high to prevent saturated video). In prior art systems, an in-operation LE recalibration was required. Such a recalibration requires that the average BF of the scene be measured, the dynamic range be adjusted to achieve an appropriate BF (scene target BF) and the FLIR entrance pupil be directed toward the TRS. The TRS is driven hot or cold until the scene target BF level is achieved, then, the calibration occurs. The calibration procedure necessarily takes the FLIR system off-line for a period of time. Inasmuch as the amount of power available for the TRS is limited, the capabilities of the TRS are limited as well and given that the hardware performing the calibration may take a while, it necessarily requires a significant amount of time for the calibration operation to occur. This is undesirable, especially during operation since the vital function of the FLIR system is interrupted.

Thus, there is a need in the art for a method and system to provide FLIR system calibration across several dynamic range settings that does not interfere with normal operation of the system.

SUMMARY OF THE INVENTION

The need in the art is addressed by the method and system of the present invention. The present invention provides a method of maintaining uniformity in a staring FLIR display appearance over time in the presence of changing temperature of scenes and optical elements, particularly in a FLIR utilizing a thermal reference source. The, inventive method comprises the steps of defining a plurality of dynamic ranges each covering a specific range of bucket fill (BF) levels when in a certain gain, performing a plurality of pairs of RE calibrations to produce RE sets of pixel gain corrections during a one time FLIR initialization procedure for each hardware set, and calibrating a plurality of LE sets (one for each anticipated dynamic range and using the appropriate RE set) at each power-up during a FLIR initialization procedure. The algorithms used require that the BF values of each two point RE calibration are centered in and span across most of the corresponding dynamic range/s and that the BF level during calibration of each LE set must fall within its corresponding RE set BF range (i.e., between the BF levels of the two point RE calibration). Then, as needed switching from a present dynamic range to a an adjacent LE calibrated dynamic range during operation according to scene/optics temperature changes that produce BF levels beyond predetermined BF levels for the present dynamic range, thereby maintaining the sensor within a dynamic range adapted to the actual scene/optics temperature ranges (i.e., preventing saturation at very high BF or excessive temporal noise at very low BF and maintaining low fixed pattern noise which is known as uniformity).

In a refinement of this method, the adjacent high and low BF levels of the present and adjacent dynamic ranges overlap (i.e., for the same scene, the BF obtained in either dynamic range is within the range of acceptable BF levels for these dynamic ranges), thereby providing a hysteresis effect against switching frequently between adjacent dynamic ranges. The combination of LE initialization calibrations and automatic dynamic range adjustment eliminates the need for in-flight touch-up calibration. Uniformity in-flight is maintained as long as the BF encountered during operation and the BF obtained during calibration of the LE set for the dynamic range used is between the low and high BF levels obtained in the calibration of the corresponding RE set. Thus, the only limitation of this method is the inability of the low and high BF levels of the RE calibration to span the corresponding dynamic range.

Under normal to cool lab conditions, the TRS temperature and gain (gain state and integration time) are adjusted to allow the BF levels of the RE calibration to nearly span the dynamic range (some reduction in span is allowed only for the coldest dynamic range). In the case that the two point RE calibration can not span across most of the, dynamic range (i.e., a degraded calibration) due to TRS and physics constraints when the FLIR is hot, an alternate RE scheme is used spreading the two BF points as far apart as is reasonably possible along with a warning system to recommend redoing of RE calibrations when the FLIR is cooler.

Defining the dynamic ranges requires two steps: 1. Basic design for nominal case. 2. Refinement during one time initialization. First in the design phase, the number of dynamic ranges and detector gain settings (gain state and integration time) for each dynamic range must be defined. The BF range for each dynamic range must be determined: along with the corresponding BF pair for the two point RE calibration (one RE set may cover more than one dynamic range). It is important that the BF values of the two-point RE calibration span across most of the dynamic range. The BF range for each dynamic range is determined by the number of dynamic ranges, the gain settings of each dynamic range, the expected temperature range of scene and optics, the optics emissivity, the optical gain and most importantly by the need to provide proper scene temperature overlap between adjacent dynamic ranges (providing hysteresis to prevent frequent switching between adjacent dynamic ranges).

The second dynamic range refinement step during a one-time initialization gain calibration is required to determine exact values for BF ranges (high and low values for: dynamic range, RE calibration, and dynamic range switch points used in determining initial dynamic range for LE initialization calibration). This refinement is required in order to adjust the process to take into account hardware tolerances which deviate from the nominal design parameters. The gain of each gain state and the BF corresponding to no photon flux are measured/calculated during the gain calibration. A means is provided for checking if the fluctuation in BF monitored in the gain calibration (each BF is read twice) will result in an inaccurate value of the calibrated gain in each gain state. Also, the calculated values of the gain of each gain state and the BF corresponding to no photon flux are checked against the expected nominal design values and deviations larger than expected are flagged as possible hardware problems.

The present invention teaches a method of maintaining display uniformity in a staring FLIR at the proper sensor dynamic range without the need for in-flight touch up calibration. The first step of this method occurs during a one time initialization defining all required low and high bucket fill values, and performing a plurality of pairs of responsivity equalization calibrations covering the dynamic ranges. High and low BF values must be defined for each dynamic range, RE calibration and dynamic range switch point used in determining the initial dynamic range for LE initialization calibration. Determining the exact values of all high and low BF levels is accomplished by a detector gain state calibration (or gain calibration for short). In this gain calibration the entrance pupil of the FLIR is aligned to a thermal reference source and change in BF is monitored in each gain state as the thermal reference source is heated. Special attention is given to set the integration time properly to prevent saturation in the highest gain state. In this process the BF corresponding to no photon flux and the gain of each gain state is calibrated and then this information is used to reset from the nominal design values all the low and high BF levels.

During the one time initialization procedure after the gain calibration, the RE bucket fill levels are achieved by aligning the entrance pupil of the FLIR to a thermal reference source, driving the thermal reference source to a low thermal level and changing the gain state and integration time as needed to match a low RE bucket fill point. Limits are placed on how low the gain may drop to prevent sacrificing the high RE BF point. A LE calibration is performed and then the TRS is driven to a high thermal level matching a high RE bucket fill point (gain state and integration time remain unchanged). The RE calibration is then performed completing one pair of RE calibrations. The process is performed initially to create the RE set that is used with the lowest dynamic range and then repeated to create RE sets used on successively higher dynamic ranges until all RE sets are calibrated. This order was done with the assumption that optics heat up with time (i.e., harder to later achieve the lowest BF) and that the TRS may be driven cold during cooldown of the detector to save time (also heating the TRS is quicker than cooling). Also, to save time the gain calibration may be done right after the LE low bucket fill calibration for the coldest dynamic range (when TRS is at its coldest and the TRS temperature will be raised for the gain calibration and the RE high bucket fill calibration for the coldest dynamic range).

The next step of this method is to calibrate a level equalization for each anticipated dynamic range at each power-up initialization (i.e., calibrate dynamic ranges which may be used during the mission). During the LE calibration, the entrance pupil of the FLIR is aligned to a thermal reference source which is adjusted to the proper temperature in combination with adjusting the dynamic range to obtain a bucket fill that falls between the corresponding pair of responsivity equalization bucket fill levels. The LE calibration is then performed. LE initialization calibrations starts with the lowest dynamic range (with the TRS as cold as possible) and continues to successively higher dynamic ranges (with TRS adjusted hotter) until all anticipated dynamic ranges are covered (order chosen again assumes optics heat up with time). An attempt is made to center the BF in the second dynamic range setting, but if the TRS requires excessive slewing then the calibration may be skewed to a lower BF. After the second dynamic range, the rest of the anticipated dynamic ranges are calibrated with a BF towards the lower end of the dynamic range, but still above the low BF of the corresponding RE set. Note that calibrating toward lower BF saves time and places the calibration in a regime that one would encounter more often (i.e., when switching to a higher dynamic range the BF will first be at the low end of the dynamic range).

The third step involves choosing the initial dynamic range (with its associated LE set, RE set and gain) based on the unpowered TRS and present scene/optics temperature. In the final step, during an operational time period immediately following initialization, as needed the algorithm changes to another of the plurality of dynamic ranges if the scene/optics temperature results in a bucket fill that exceeds threshold levels (too low or high) of the initial dynamic range. The BF of the sensor is constantly monitored with filtering so that very temporary changes in the scene caused by movement of the gimbaled telescope will not result in unnecessary switching of dynamic ranges. As a refinement of this method, adjacent high and low BF levels of two adjacent dynamic ranges overlap, thereby providing a hysteresis effect against switching frequently between adjacent dynamic ranges.

Redoing of the whole process above may be required. In the case that the two point RE calibration can not span across most of the dynamic range due to hardware and physics constraints when the FLIR is hot, an alternate RE scheme is used spreading the two BF points as far apart as is reasonably possible. The alternate RE scheme uses a simple algorithm which reduces the span of each two point RE calibration and allows for lower gain adjustment in order to achieve this reduced span. Original RE calibrations will check the need for and flag the use of the alternate RE scheme based on the BF obtained when the TRS is at its coldest. The degraded calibration may not adequately cover the range of BF levels encountered in operation and in extreme cases the BF during LE initialization may not fall between the BF levels of the two point RE calibration. A warning system was thus developed so that in cases of a degraded RE calibration, a recommendation to redo the RE calibrations is made when the FLIR is cooler. In the warning system, a RE quality factor is calculated. Since the spread in BF in the RE calibration is dependent upon the BF obtained when the TRS is cold, the RE quality uses this BF value which is obtainable at initialization before the start of RE or LE calibration.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
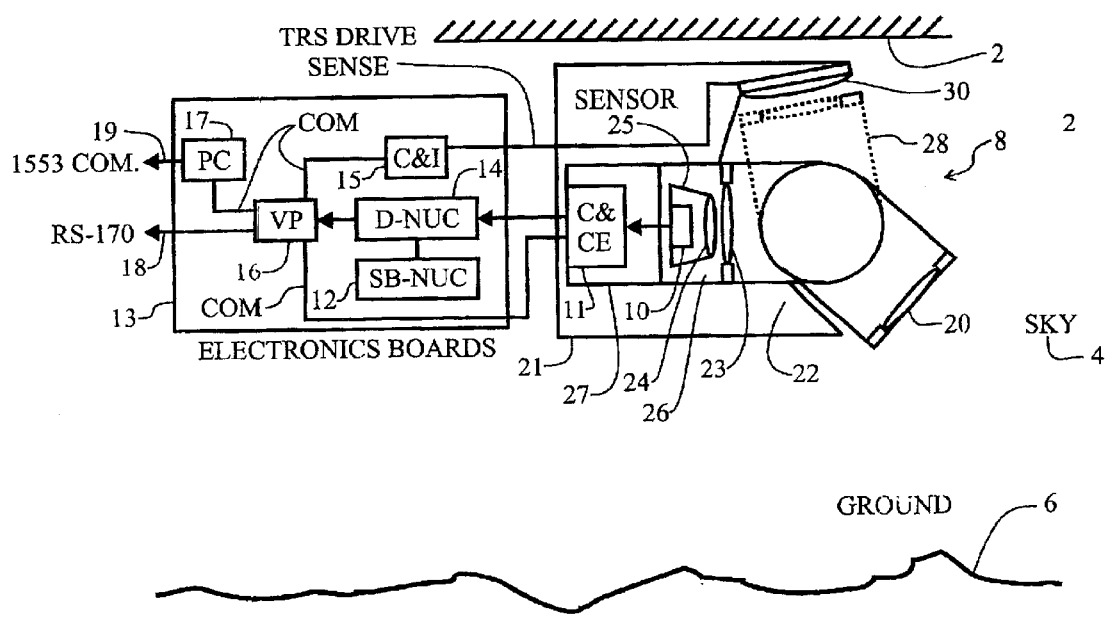
FIG. 1 is a hardware functional block diagram of an illustrative embodiment of the present invention.

FIG. 1 is a functional block diagram of an illustrative embodiment FLIR system as it might be deployed on an aircraft. The present invention utilizes an algorithm that is employed in the initialization procedures of forward-looking infrared ("FLIR"). The aircraft 2 operates in the sky 4 above the ground 6. A FLIR pod 8 is mounted to the aircraft 2. Within the FLIR pod 8 is the Staring Detective Assembly ("SDA") 27 that consists of items 10, 11, 23–26 and the cryogenic cooler (not shown). In the SDA, a focal plane array ("FPA") image sensor 10 comprises a plurality of image sensing elements, called pixels. The light energy incident upon the FPA 10 is integrated over time and the resultant signal is coupled first to the electronic circuitry of the SDA and identified by the acronym "C&CE" 11. C&CE is the acronym for Command and Control Electronics which slightly amplifies the FPA signal to achieve the appropriate responsivity. The signal from the C&CE is coupled to certain electronic boards 13 external to the sensor, identified by the functional blocks having the acronyms "D-NUC" 14 and "SB-NUC" 12. D-NUC (Digital Non-Uniformity Correction) 14 converts the C&CE analog signal into a digital signal and applies RE and LE (gain and level) corrections to each imaged pixel of the FPA. The D-NUC also carries out the RE and LE calibrations and stores the RE and LE sets of correction coefficients. The SB-NUC (Scene Based Non-Uniformity Correction) applies to the DNUC additional uniformity corrections based on the scene and helps to overcome the limitations of this invention. The processed signal information output from the D-NUC 14 is coupled to a video processor ("VP") 16 that applies level, gain, polarity (black or white hot) and display gamma corrections and then converts the signal information into the EIA recommended standard RS-170 video format 18. The RS-170 formatted signal 18 is ultimately coupled to an RS-170 compliant video display (not shown) in the aircraft 2 cockpit (not shown), for viewing by the pilot, or other aircraft personnel. Such displays are understood by those of ordinary skill in the art. All the algorithms of the invention reside in the VP. The VP communicates with all the Electronic boards shown in FIG. 1. Ultimate control of the pod's/VP mode is via the Pod Controller ("PC") 17 which the pilot can communicate with via the 1553 Bus.

Within the FLIR sensor 21 or EOSU (Electro-Optical Sensor Unit) is an entrance pupil 20 that is directed toward the scene to be viewed by the FLIR pod 8. The FLIR sensor comprises a complex gimbaled optical systems 22 that employs both reflective and refractive optical elements that gather, focus, and direct infrared light energy from the scene to the FPA 10. Such optical systems are generally understood by those of ordinary skill in the art. A detector dewar window 23 defines the entrance to a dewar chamber 26 that houses the FPA 10. The dewar chamber is an insulated (generally by vacuum isolation) container that can internally maintain a low thermal energy level by the cryogenic cooler (not shown), thus controlling the level of thermal noise incident upon the FPA 10. Within the dewar chamber 26 is the cold filter aperture 24 which is at the entrance of the coldshield 25 and are maintained at 77K along with the FPA 10. The gimbaled optical system 22 and the detector dewar window are not maintained at a low thermal energy level, and thus are affected by ambient conditions and is a source of noise which needs to be addressed in calibration and operation of the FLIR system.

Part of the calibration of the FLIR system requires the use of a thermal reference source ("TRS") 30 which is affixed to the sensor 21 of the FLIR pod 8. In operation, the FLIR sensor 21 entrance pupil 20 can be pointed toward the TRS 30, as illustrated by the phantom location 28 illustrated in FIG. 1. The TRS can be driven to various known temperatures (VP communicates with/commands Control and Interface board C&I 15 which drives TRS), and has a flat black surface of known thermal characteristics. Thus, calibration can be accomplished by directing the entrance pupil 20 toward the TRS 30, while driving the TRS to known temperatures and running calibration algorithms within the FLIR systems to establish various operational parameters. These parameters include, the sensor brightness, or bucket fill levels, the dynamic range of operational constraints, and certain other signal manipulation and sensor parameters, which will be more fully discussed hereinafter.

The calibration algorithms accomplish initialization set-up of the responsivity equalization ("RE"), or pixel to pixel gain calibration, and, the level equalization ("LE"), or pixel to pixel level calibration. These calibrations when set-up properly maintain FLIR video display uniformity over time and changes in the temperature of the optics and scene. After RE and LE calibrations, the ability to maintain uniformity is only limited by the thermal stability of the detector and changing fixed pattern noise due to drastic temperature changes of refractive optics (SB-NUC board and its algorithms are designed to deal with these limitations). The RE is a two-point signal gain correction while the LE is a single-point level correction, which ideally falls within the two-point correction value range. The present invention process sets up the total number of RE sets, LE sets and dynamic ranges to be used for each during operation. The dynamic range ("DR") is defined by the VP software controlled detector gain variables of detector assembly gain state ("DA_gain") and detector assembly integration time (DA_t_int). Also, the design process sets up what range of scene/optics temperature each dynamic range, RE set, and LE set adequately correct for.

In the preferred embodiment, which is a Raytheon Advanced Targeting Forward Looking Infrared ("ATFLIR"), three separate RE calibrations are used to cover four dynamic ranges (the middle two dynamic ranges are covered by one RE set). Of the four dynamic ranges, up to three are covered by LE calibrations in a single mission (i.e., one power on cycle). LE calibration occurs for as many dynamic ranges as possible, and is constrained by available systems RAM. It should be understood that in other illustrative embodiments, there might be no memory constraints so that any number of RE sets, LE sets, and dynamic ranges can be employed, as operational parameters dictate.

The algorithms utilize automatic DR adjustment. The algorithm depends on having the TRS, which is a uniform blackbody surface with adjustable temperature. As noted above, the TRS is placed near the entrance pupil of the FLIR and is used to calibrate out nonuniformities caused from optics as well as inherent FPA detector nonuniformities. The LE and RE calibrations depend on viewing the TRS at the appropriate temperatures. The algorithm control of the TRS and DR switching is based on the average level of the optics and scene thermal energy. The algorithm uses Bucket Fill ("BF") levels, which are defined as a fraction of the video analog to digital conversion range. The preferred embodiment uses a fourteen bit A-to-D (this hardware is in the D-NUC 14 of FIG. 1) so the A-to-D range is 0 to $2^{14-1}$ (the average digital video level is referred to as "video_avg") which converts to a BF range of 0 to 1. The A-to-D binary levels are correlated to input voltage levels (from the C&CE) between −2.5 volts and +2.5 volts. The design process sets up the two BF points for each RE calibration (done as a system maintenance action only), the BF for each possible LE calibration (done as part of every initialization), the initial DR to be set, and the BF switch points for an automatic Dynamic Range (DR) adjustment algorithm.

In the preferred embodiment, the FLIR calibration algorithms are designed to provide the lowest display nonuniformity reasonably possible with very few LE sets, RE sets and dynamic ranges. The algorithm also automatically adjusts for gain tolerances in each detector (this occurs in the gain calibration). Another metric is for the algorithm to provide the quickest possible LE initialization duration (cost of eliminating Touch-up calibration is a lengthy LE initialization). The TRS slew rate and stabilization time is the limiting factor in the preferred embodiment as power constraints and system physical limitations limit the speed with which the TRS can be driven to a given temperature during the calibration process. A final metric is to prevent excessive switching between dynamic ranges due to rapidly changing scene conditions, such as sky-view to ground-view transitions. Changes in the dynamic range (i.e., change to detector gain state and integration time) can manifest as momentary display flicker due to lagging histogram level and gain processing in the VP. Display flicker is a distraction to pilot operation of the system and aircraft.

Prior art staring FLIRs depended on using touch-up calibration during flight to adjust to operational variances. Touch-up calibration resets the dynamic range being used, adjusts the TRS temperature to the scene temperature, performs an LE calibration to provide good uniformity for that dynamic range, and finally a blinker calibration. Blinker calibration is a process of finding excessively noisy pixels so that they can be substituted for a more uniform display appearance. Unfortunately, there is no guarantee in the prior art systems that the touch-up calibration's new Bucket Fill for the LE would fall between the two Bucket Fill readings in the original two-point RE gain correction. The new Bucket Fill should fall in between to produce the best display uniformity. The present invention algorithm guarantees that the Bucket Fill for the LE will fall between the two Bucket Fill readings in the two-point RE gain correction except in the hottest condition, although the default integration time may be lowered in this dynamic range to prevent this exception. Also, because as many dynamic ranges are LE calibrated as possible during initialization, the FLIR may switch dynamic ranges as needed. The limiting factors for how many dynamic ranges can be calibrated during initialization are the ability of the TRS to go cold (may not reach temperatures required for the cold dynamic range), the temperature control limits of the TRS as set by the electronics, and, system optics transmission. The detector picks up photons from the optics so the BF lower limit is based on how hot the optics is and the transmission of the optics. In the preferred embodiment, it is assumed that in the worst case the optics emissivity equals one minus transmission.

Note that eliminating the need for in-flight touch-up calibration frees the pilot up to take care of other concerns. Because the LE calibrations are done as part of initialization in the present invention, the algorithm reduced the time for these initialization calibrations as much as possible so that the FLIR could be ready quickly after activation. The worst case estimates in the preferred embodiment ATFLIR are four minutes after cooldown of the detector dewar chamber and two minutes at hot when cooldown time is longest.

In summary, the present invention algorithms are used to properly adjust the BF for each of the aforementioned calibrations. The actual LE and RE calibrations are performed by hardware in the D-NUC; however, the BF levels are specified by the present invention algorithms.

The following modes of operation apply to the preferred embodiment ATFLIR:

1. Test RE calibration—This mode determines one RE set for use on all dynamic ranges.
2. Full RE calibration—This mode determines three RE sets for four dynamic ranges (middle two dynamic ranges shares a common RE set). This mode may be performed manually.
3. Automatic full RE calibration—This mode of calibration is performed automatically during initialization of the FLIR systems, such as when hardware is changed, for example.
4. Test LE calibration—In this mode, one LE set is generated for one dynamic range.
5. LE initialization calibration—In this mode, up to three LE sets for three dynamic ranges are generated.
6. Touch-up calibration—As noted above, in this mode, one LE set is generated for one dynamic range during flight, and, both DR and BF are based on the scene. While this mode is not required according to the present invention, it can be retained if the pilot wants to have manual, in addition to automatic, control.
7. Automatic Dynamic Range Adjustment during normal operation—This mode is effective after initialization, when the dynamic range is automatically switched if needed during normal operation to accommodate changes in scene and operating conditions.

The present invention is primarily directed to determination of the BF levels for the full RE (automatic or manual) and LE initialization calibration modes, and BF levels and algorithms for automatic DR adjustment during normal operation of the FLIR system.

The particular calibrations contemplated under the present invention generally, and the ATFLIR preferred embodiment specifically, respecting the foregoing modes are as follows:

1. Calibration at a pair of BF levels for a single RE set—This calibration requires one LE low calibration, which is performed with the TRS adjusted to achieve a lower BF=LE_lo, and 1 RE high calibration, which is performed with TRS adjusted to achieve a higher BF=RE_hi.
2. Calibration of detector gain—During full RE calibration, the present invention algorithms readjust minimum and maximum BF levels for each dynamic range (referred to as "BF_lo" and "BF_hi" respectively) as well as LE_lo and RE_hi for all RE calibrations based on relative gain (gain_val(DR)) of each gain state, and, delta BF is examined in each gain state.
3. TRS Gain Calibration—The present invention does not address the details of this calibration, as that is an independent function of the FLIR system. However, TRS calibration does occur during the LE initialization calibration mode.
4. Blinker Detection—During LE initialization, noisy pixels are located and then added to a pixel substitution map. The pixel substitution map consists of noisy pixels as well as pixels having values beyond the dynamic range rails maximum or minimum values of LE or RE coefficients. The blinker detection is performed by the D-NUC hardware and will not be discussed in detail herein.

Figure 2:
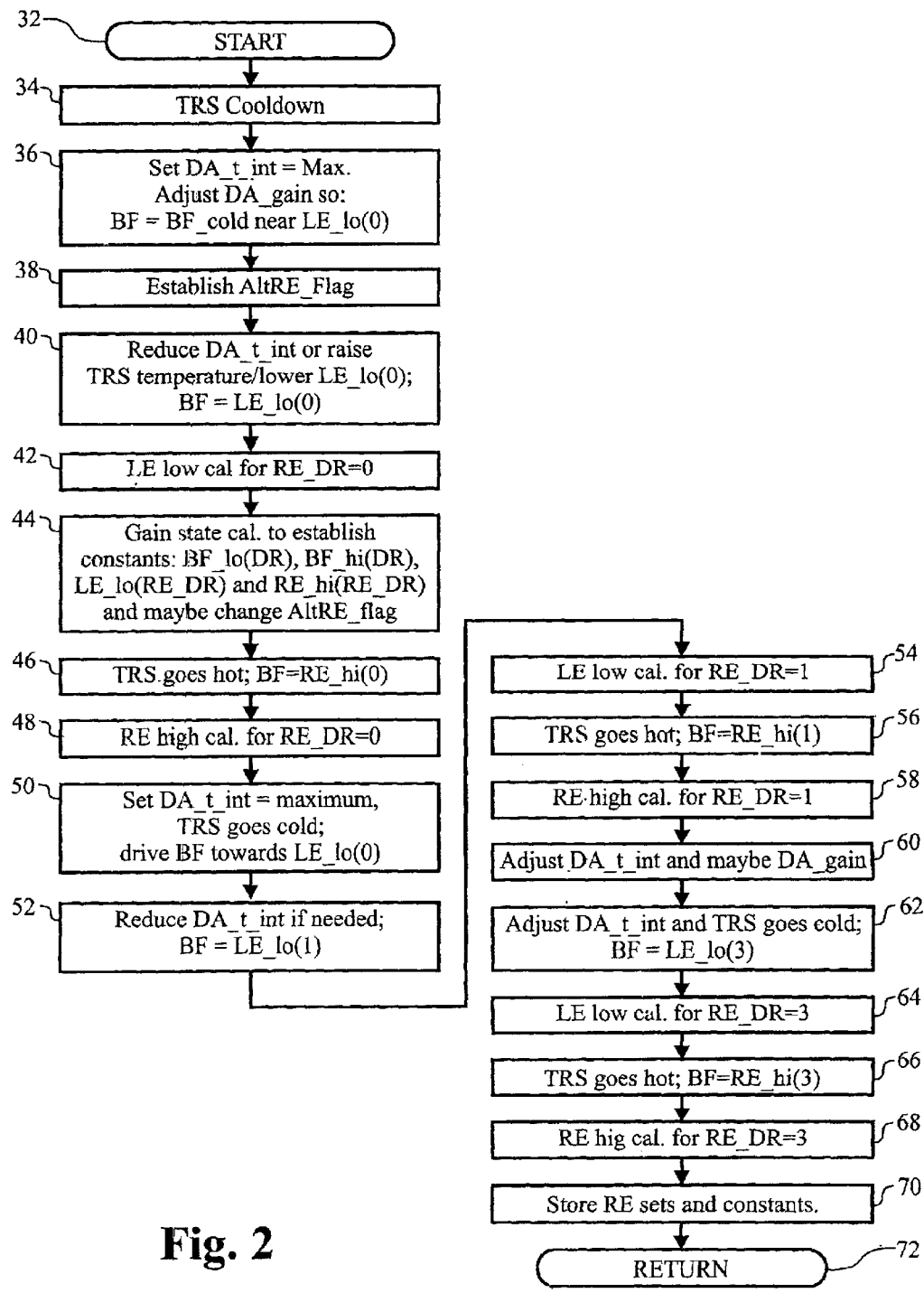
FIG. 2 is a process flow diagram of the RE calibrations- an illustrative embodiment of the present invention.

Reference is now directed to FIG. 2, which is an algorithm flow diagram of the procedure for automatic full RE calibration in the preferred embodiment ATFLIR FLIR system. The variables used in this flow diagram are listed below, each with a brief description.

| | |
|---|---|
| RE_DR | Dynamic Range being calibrated |
| DR | Dynamic Range (DR = 0, 1, 2 or 3) where DR = 0 is the coldest dynamic range (DR = 3 − DA_gain) |
| DA_gain | Gain state of detector (there are 4 gain states 0, 1, 2, 3 with 3 at the highest gain)* |
| DA_t_int | Integration time of detector (msec)* |
| BF | Bucket fill level ranging from 0 to 1 |
| BF_lo | BF threshold at lower limit of DR-switching point to a lower dynamic range (more gain needed to raise BF) |
| BF_hi | BF threshold at upper limit of DR-switching point to a higher dynamic range (less gain needed to lower BF) |
| LE_lo(RE_DR) | Low BF for LE calibration in two point RE calibration |
| RE_hi(RE_DR) | High BF for RE calibration in two point RE calibration |

*Detector gain variables-In FIG. 1, VP commands C&CE which sets DA_gain and DA_t_int in FPA.

The process begins at step 32, which is the entry point called from another portion of the FLIR system software. Flow proceeds to step 34 where the TRS is driven as cold as possible (during detector cooldown for automatic fall RE) in preparation for a full RE calibration. Next, at step 36, the integration time is initialized at its maximum value as "DA_t_int=16.41 msec" and gain state "DA_gain" is set in an attempt to achieve BF=LE_lo(0). BF value is saved and named BF_cold. Then at step 38, the AltRE_flag is established based on comparison of BF_cold and LE_lo(0). This flag is set if LE_lo can not be achieved without greatly lowering DA_t_int which then compromises RE_hi (i.e., would require the TRS to go hotter than its control limit to achieve RE_hi). If the flag is set, alternative values of LE_lo and RE_hi are used. In general, AltRE_flag may only be set when the FLIR optics is too hot at the time when fall RE calibration is taking place. At step 40, the integration time, DA_t_int, is adjusted as needed to achieve LE_lo(0) (if the optics are too warm then DA t int must be lowered) or TRS temperature is raised in combination with lowering LE_lo(0) (lowering LE_lo(0) is desired to spread the two RE points as long as RE_hi(0) is still achievable). At step 42, the LE low calibration for RE_DR=0 is performed by the D-NUC. At step 44, the detector gain state calibration measures the gain of each gain state (gain_val(DR)) and the theoretical BF corresponding to no photon flux (BF_null). In this calibration, change in bucket fill is monitored in each dynamic range as the thermal reference source is heated. Knowing BF_null and gain_val(DR) for all DR allows calculation of BF_lo(DR) and BF_hi(DR) for each DR and LE_lo(RE_DR) and RE_hi(RE_DR) for each RE_DR (note LE_lo(0) is not revised since this calibration has already taken place—this was done this way to save time). Calculation using BF_null and BF_cold predicts whether or not LE_lo(1) can be achieved and then AltRE_flag may be set if not already. Two other parameters, Delta_BF_lo and Delta_BF_hi, which are used to set DR in LE initialization and LE touch-up calibration (if touch-up calibration is allowed) are also calculated in the gain calibration. These parameters will be discussed in more detail in the discussion of FIG. 3.

Having completed the detector gain state calibrations, the TRS is driven hot to achieve BF=RE_hi(0) at step 46. At step 48, the high calibration for RE_DR=0 is accomplished by the D-NUC.

The remaining steps calibrate RE_DR greater than zero and the process is similar to steps 34 through 48 except steps 38 and 44 are skipped. Continuing at step 50, DA_t_int is set to maximum and the TRS is driven cold driving the BF towards LE_lo(1) (TRS may not need to go as cold as possible). Then, at step 52, the integration time DA_t_int is reduced if needed to achieve LE_lo(1). At step 54, the LE low calibration for RE_DR=1 is accomplished. After that, at step 56, the TRS is driven hot to achieve BF=RE_hi(1), and the RE high calibration for RE_DR=1 is accomplished at step 58. At step 60, DA_t_int and possibly DA_gain are adjusted. In this last RE calibration, LE_lo(3) is easily achieved (LB_lo(3) is much higher than LE_lo(0)), but RE_hi(3) may be more difficult to reach without adjusting the overall gain. Setting DA_t_int and DA_gain are based on modeling and test and is highly dependent on optics transmission, detector responsivity and the maximum TRS control temperature. On ATFLIR, the desirable setting for DA_t_int is the default setting for DR=3 and in most cases DA_gain is raised by 1 gain state (overall this is an increase in gain). Then, at step 62, TRS is driven cold to achieve BF=LE_lo(3). At step 64, the LE low calibration for RE_DR=3 is accomplished. At step 66, the TRS is driven hot to achieve BF=RE_hi(3), and at step 68, the RE high calibration for RE_DR=3 is accomplished. At step 70, the three RE sets and constants generated from the gain calibration are stored in flash memory for later use. The process is exited and returned from at step 72.

Based primarily on the TRS drive and stability rates, the predicted length of time for the automatic full RE on ATFLIR is between eleven and fifteen minutes depending on the soak temperature of the FLIR. The soak temperature is the stabilized temperature of the FLIR pod, especially the temperature of the optical components.

Figure 3:
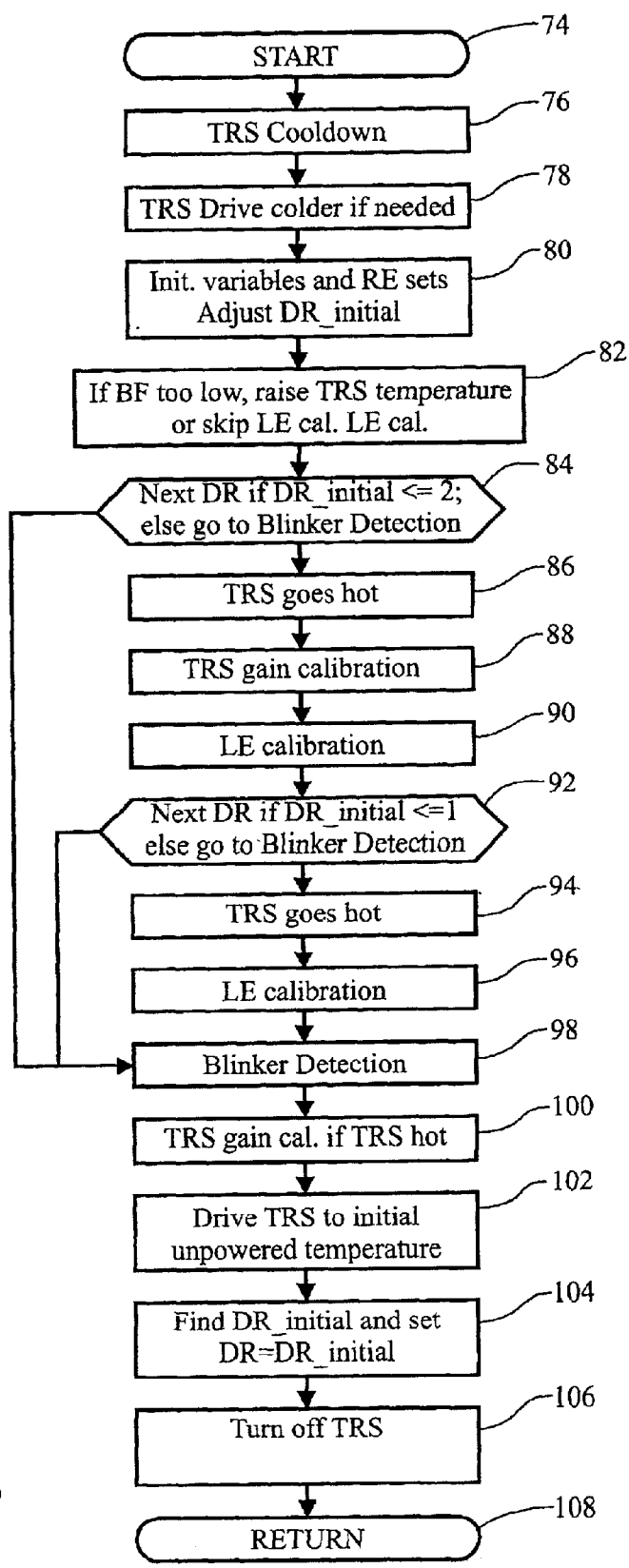
FIG. 3 is a process flow diagram of the LE calibration- an illustrative embodiment of the present invention.

Reference is now directed to FIG. 3 which is a flow diagram of the procedure for LE initialization in the preferred embodiment ATFLIR FLIR systems. The dynamic ranges are calibrated in the coldest achievable DR first and the hottest DR last. The process is entered by a call from elsewhere in the FLIR system software to step 74. At step 76, the TRS goes cold during the detector cooldown period. Next, at step 78, if the TRS is not stabilized cold then the TRS is driven cold as needed. At step 80, the RE sets and needed variables from the gain calibration (all constants except LE_lo(RE_DR) and RE_hi(RE_DR)) are initialized from flash memory, and, DR_initial (in this case DR initial is the coldest and initial dynamic range of the LE initialization calibration and not the initial dynamic range to be used in operation) is adjusted if needed to be within the desired BF ranges. Delta_BF_lo and Delta_BF_hi from the gain calibration provide this desired BF range. Specifically, the dynamic range is adjusted until BF is between (BF_lo(DR)+Delta_BF_lo) and (BF_hi(DR)−Delta_BF_hi). The values of Delta_BF_lo and Delta_BF_hi guarantee that the BF is at least half the scene temperature overlap away from the adjacent dynamic range and between LE_lo(DR) and RE_hi(DR). Note that the proper RE set is used each time DR is selected. At step 82 the LE calibration is performed by the D-NUC, however, this step is skipped if DR_initial is greater than one and BF is too low. In the case that the LE calibration does not occur, only one or two dynamic ranges will be calibrated (i.e., not three) so there is time to reset the TRS temperature to provide a BF which is closer to the center of DR_initial (note that the variable DR_initial is reduced by one so that the original DR_initial will be calibrated in the next step). If DR_initial is zero or one and the BF is too low, then the TRS temperature is raised slightly before the LE calibration (this is to prevent the LE bucket fill from being too close to LE_lo). At step 84, the next DR is selected if DR_initial is less than or equal to two (i.e., there are no more hotter dynamic ranges to calibrate if DR equals three). On the other hand, if it is not, then flow continues to step 98 for the blinker detection process, which will be discussed below.

At step 86, the TRS is driven hot to achieve desired BF level (it is desired to have a BF level near the BF center of the dynamic range although the BF chosen may be less if the change in BF required is too large—i.e., to save time). At step 88, the TRS gain calibration is made. At step 90, the LE calibration is performed. Then, at step 92, the next DR is selected if DR_initial is less than or equal to one (i.e., next DR equals 2 or 3). If not, then flow continues at step 98 for the blinker detection sequence. At step 94, the TRS is driven hot to achieve the desired BF level and the LE calibration is accomplished at step 96. Blinker detection, as was discussed herein before occurs at step 98. Next, at step 100, the TRS gain is calibrated if the TRS is hot at his point in the process. At step 102, the TRS is driven to its initial unpowered temperature. At step 104, the process finds DR_initial and sets DR equal to DR_initial. Then, at step 10, the process turns off the TRS. Finally, the process returns to the calling routine at step 108.

Under typical conditions, the predicted length of time for LE initialization is between 2 and 4 minutes depending on the soak temperature of FLIR.

The aforementioned processes are general concepts, which are applied to the preferred embodiment ATFLIR. What follows is a discussion of such application.

The preferred embodiment ATFLIR uses four dynamic range settings to optimize performance for any given set of operating conditions. The detector gain state ("DA_gain" with relative gain equal to "Gain_val(DR)") and integration time ("DA_t_int") for each dynamic range setting ("DR") is shown in Table I on the next page. The preferred dynamic range for any given situation will be a function of the temperature of the scene and the temperature of the optics. Since these conditions can change dramatically over a mission time period, changes in the dynamic range setting may be required during operation of the system. The present invention utilizes an automatic algorithm to change the dynamic range selection (the dynamic range may also be changed automatically during a touch-up calibration) to keep the bucket fill levels in an acceptable range. A BF level that is too low will result in increased display noise, and a BF level that is too high may result in display saturation and loss of visual information. With an algorithm that changes DR range selection, there is naturally a problem with excessive changes, which can result in annoying display flicker and confusion to the pilot. This problem is addressed by employing hysteresis in the change selection process. Temperature overlap, which is 27.4±0.6° C. of background temperature overlap at constant optics temperature, between dynamic ranges provides adequate hysteresis and prevents jumping back and forth between two dynamic ranges. In the preferred embodiment, the LE terms are calibrated for each dynamic range setting. Since calibrations require the sensor to be off line for many seconds, calibration for all usable dynamic range settings are performed during initialization. Changing the dynamic range to keep the average video display brightness ("video_avg") in an acceptable range can happen at any time except during target tracking with the FLIR.

Table I below tabulates the relationship between the dynamic range (DR), the detector gain state ("DA_gain"), the dynamic range gain value ("Gain_val(DR)"), and the integration time ("DA_t_int") in the preferred embodiment.

TABLE I

Detector Gain and Integration Time for ATFLIR Dynamic Range Settings

| DR | DA_gain | Gain_val(DR) | DA_t_int(msec)* |
|---|---|---|---|
| 3 | 0 | 1.0 | 14.508 |
| 2 | 1 | 1.33 | 16.413 |
| 1 | 2 | 2.0 | 16.413 |
| 0 | 3 | 3.6 | 16.413 |

Because of the relatively low transmission of the ATFLIR optics, the optics temperature has a large impact on the selection of the dynamic range. Under all but the hottest conditions, the optics temperature will increase with operation. Therefore, it is much more likely that the dynamic range setting will need to be increased during operation than it will need to be decreased. Moreover, if the dynamic range setting is too high, there is a relatively small performance impact (which is somewhat increased noise) while if the setting is too low, there is a large performance impact (which is loss of information due to saturated video). For these reasons, the initial dynamic range setting is biased towards a higher setting. In Table II below, is the predicted optics/background temperature range corresponding to the bucket fill (BF) range (BF_hi(DR) to BF_lo(DR)) when viewing a scene. Also, saturation information is given. Also, note that temperature vs. BF information for each dynamic range is shown as part of a plot in FIG. 4, discussed hereinafter.

TABLE II

Optics/Background Temperature vs. Dynamic Range and Bucket Fill

| DR | Bucket Fill[1] using RE(DR,x,y) | Nominal Responsivity Systems[4] |
|---|---|---|
| 3 | 33% < BF < 78%[2] use RE(3,x,y) | $T_{opt} = T_{bkg} > 29.9°$ C. |
| 2 | 29% < BF < 68% Use RE(1,x,y) | 14.5° C. < $T_{opt} = T_{bkg}$ < 41.5° C. |
| 1 | 23% < BF < 62% use RE(1,x,y) | −2.5° C. < $T_{opt} = T_{bkg}$ < 26.4° C. |
| 0 | 11% < BF < 60%[3] use RE(0,x,y) | $T_{opt} = T_{bkg}$ < 9.6° C. |
| 3 | Saturation (Hot) | C&CE voltage = 2.5 V at BF = 100%, electrons = 16.6 × 10[6] |
| 0 | Saturation (Cold) | C&CE voltage = −2.3 V, BF_null = 4.0%, electrons = 0 |

Table II footnotes:
[1]Bucket Fill (BF = video_avg/($2^{14}$ − 1) is linear to the histogram where 0% corresponds to the 0 histogram bin (−2.5 V out of C&CE) and 100% corresponds to the $2^{14}$ − 1 histogram bin (+2.5 V out of C&CE). Note that the default low and high BF values are the same as in this table except for the low BF when DR = 0 and the high BF when DR = 3 (for these cases use worst case expected when looking at the TRS).
[2]78% is based on $T_{opt}$ = 66° C. and $T_{bkg}$ = 50° C., or $T_{opt}$ = 69.4° C. and TRS_temp = 42.6° C. where additional transmission loss is from TRS window (see note 5)
[3]11% is based on $T_{opt}$ = −32.2° C., $T_{bkg}$ = −40° C.
[4]Below are parameters which may be used to calculate nominal system gain and BF for a given scene/optics temperature. System optics transmission = 0.45*0.96 (see note 5), effective cold filter transmission = 0.97*0.925913 (see note 5), Responsivity of SDA (detector gain when DA_gain = 0, DA_t_int = 16.41 msec, scene at 295K) = 43 mv/K, Low rail of C&CE = −2.3 (i.e., BF_null = 0.04). fno = 6.165 (coldshield establishes fno; fno = focal length/aperture diameter and optical gain or photon flux is proportional to transmission/fno[2]).
[5]0.96 = transmission of dewar window, 0.97 = cold filter transmission, 0.925913 = average response of 480 × 480 array due to coldshield effect (response = 1 in center and decreases radially outward). 0.975 = transmission of TRS window, emissivity of TRS = 1, emissivity of optics = 1-optics transmission The following temperature assumptions were employed in order to model bucket fill during LE initialization and Full RE calibrations in the preferred embodiment ATFLIR FLIR systems.

A. General formulas used for TRS_temp_min (lowest sustainable TRS temperature) and $T_{opt}$ (optics temperature) in terms of $T_{soak}$ (pod soak temperature):

TRS_temp_min(° C.)=0.91*TRS_temp_start−21.3° C. where TRS_temp_start=unpowered TRS_temp
TRS_temp_start=(2*$T_{opt}$(cooldown)+$T_{soak}$)/3+$T_{opt}$−$T_{opt}$(cooldown) where $T_{opt}$(cooldown)=$T_{opt}$ after dewar cooldown and is defined in sections B & C.
$T_{opt}$=$T_{opt}$(cooldown)+(#large TRS changes)*delta$T_{opt}$/4+(#small TRS changes)*delta$T_{opt}$/10 where TRS changes are commanded changes in TRS temperature during calibration after dewar cooldown and a large TRS change is a change greater than 14° C. Note that large changes in TRS temperature occur right before each LE or RE calibration with the exception of the first calibration after cooldown. This formula is attempting to simulate the ATFLIR optics tendency to heat up over time.
delta$T_{opt}$=$T_{opt}$(cooldown)−$T_{soak}$
During dewar cooldown TRS cools to the larger of TRS_temp_min(° C.) or −10° C.

B. LE calibration temperature assumptions:
  LE initialization calibrations performed with 4.4° C. aircraft air, Tsoak max. =71° C., Topt(cooldown)= (30+15*Tsoak)/16
  Order of calibrations: coldest to warmest dynamic range.
    1st LE calibration (cal for short): TRS cools to larger of TRS_temp_min(° C.) with Topt=Topt (cooldown) or −10° C. Add 14° C. if BF too small or skip 1st LE cal.
    2nd LE cal: Heat TRS to achieve BF=midway between BF_lo to BF_hi or if BF change too much then achieve slightly less than BF=one third of way from BF_lo to BF_hi
    3rd LE cal: Heat TRS to achieve BF=slightly less than one third of way from BF_lo to BF_hi C. Full RE calibration temperature assumptions:
  RE calibrations performed with ground fans & Tsoak max. =60° C., Topt(cooldown)=(40+16*Tsoak)/16
  Order of calibrations: RE_DR=0,1,2,3; where RE_DR is DR being calibrated at fixed LE_lo(RE_DR) & RE_hi(RE_DR). TRS is cooled to achieve LE_lo (DA_t_int reduced if can't achieve) and heated to achieve RE_hi.

What follows is a discussion of the results of modeling LE initialization and full RE calibrations at various soak temperatures on the preferred embodiment ATFLIR FLIR system. On ATFLIR, initialization occurs in the following order: 1. detector cools down while performing preliminary BIT (Built In Test) 2. BIT 3. Video calibrations (automatic full RE if needed then LE initialization). Based on reasonable timeouts set in the software and based on calculations of TRS temperature and estimated optics temperature to achieve the desired bucket fill levels, the full auto RE initialization from end of BIT (step 2) to full RE completion, which includes the time for the TRS to go back to its unpowered temperature after the full RE, is between twelve and fifteen minutes. This is acceptable for a maintenance action on an aircraft such as replacement of D-NUC or sensor. Based on timeouts set in the code and calculation of TRS temperature and estimated optics temperature to achieve the desired bucket fill, the initialization LE from end of BIT (or fall RE completion) to LE initialization completion is between two and four minutes, which is considered acceptable since the combined time of detector cooldown plus initialization LE will be less than twelve minutes. Cooldown is longer, up to ten minutes, when hot soaked but the LE initialization gets shorter since the LE calibration is performed on fewer dynamic ranges.

In the preferred embodiment, the automatic full RE provides acceptable display uniformity over time and temperature after LE initialization if the automatic full RE was performed when the pod was soaked at a temperature below 43° C., in terms of allowing the LE initialization BF point to be between the BF of the two point RE correction (this holds true if the LE initialization is not performed when the pod experiences extreme cold or hot soaks). Note that if the TRS is allowed to slew to 95° C. then the RE scheme can be slightly modified (i.e., allowing the integration time to drop to 5.24 msec for RE_DR=0) to provide a sufficient RE even when the pod is hot soaked all the way to the maximum maintenance temperature of 60° C. Optimum RE is achieved when soaked below 9° C. (broadest range between RE_hi and LE_lo in DR=0) although a very good RE is still achieved when soaked below 25° C. The modeling assumes that the RE calibration is sufficient when performed in any gain state or integration time as long as the LE low calibration and the RE high calibration are performed with the same gain state and integration time. Since the TRS has a limited ability to go cold and BF can not fall below the value determined by the optics temperature/emissivity (optics temperature is assumed to rise with time), the gain state and integration time must be set for the low calibration first. The LE correction for LE initialization must be done at the default gain state and integration time for the dynamic range being calibrated (i.e., following Table I). Also, the modeling assumes that the TRS appears relatively uniform when slewing the TRS as much as 28° C. below the unpowered TRS temperature (seen at LE initialization when hot soaked at 71° C.) or as much as 82° C. above the unpowered TRS temperature (seen in $3^{rd}$ LE calibration When soaked at −40° C.). The default integration time for DR=3 (DR when hot) was established based on the assumption that the LE is sufficiently good if BF is less than 0.78 (higher BF should not be used because some pixels near the center of the array may saturate due to the coldshield effect and normal pixel to pixel offset variation).

Figure 4:
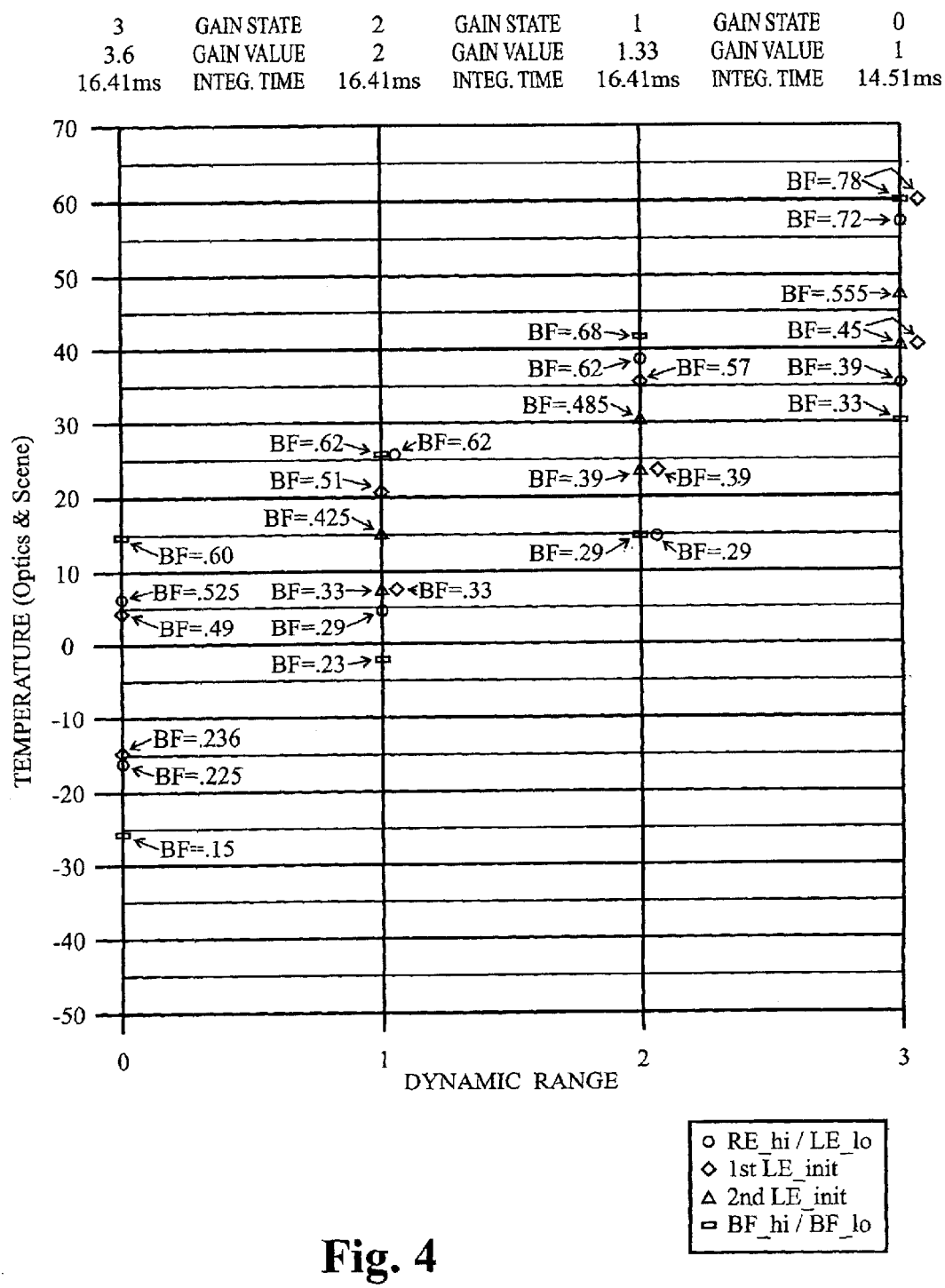
FIG. 4 is a chart of dynamic range bucket fill values according to an illustrative embodiment of the present invention.

The results of the modeling runs for the preferred embodiment ATFLIR system when altRE_flag=0 (soaked below 29.2° C. when the automatic full RE is performed) is summed up in the plot in FIG. 4. Attention is now directed to FIG. 4, which is a summary of expected BF values for the four DRs as a function of scene/optics temperature (set equal to each other for simplicity) in the preferred embodiment. FIG. 4 is organized as four dynamic ranges (DR's) across the bottom with the temperature (° C.) of the optics and scene up the left side. All of the plots provide bucket fill (BF) levels which range from zero to one of the total range from zero to ($2^{14}$−1), as discussed herein before. The plot in FIG. 4 shows where the LE initialization calibrations occur relative to the two point RE calibrations ("RE_hi" and "LE_lo" denoted by circles) in terms of BF and in terms of temperature. Note that the LE initialization calibrations occur between the two point RE calibrations except when the LE initialization is performed under very hot conditions (above 57° C. when BF exceeds 0.72). Also, notice that each successive LE calibration is done over a narrower range. The first calibration (denoted by diamonds) will occur at a BF point as determined by choosing of the dynamic range, for the TRS is driven cold during cooldown without the ability to observe BF (in the preferred embodiment, dewar must be at 77K before the average video level can be determined). If the BF is too low (i.e., too close to LE_lo) when DR equals 0 or 1, then the TRS will be driven hot by 14° C. The second LE initialization calibration may occur at one of two BF points (denoted by triangles). The lower of the two points is chosen if the TRS requires excessive heating. The third LE initialization calibration always occurs at the lower $2^{nd}$ LE BF point (denoted by lower triangle for DR=2 or DR=3) to prevent excessive TRS slewing. Note that the method chosen to determine where the LE initialization calibrations occur minimizes the time of the initialization as well as placing the calibration at a desired BF (i.e., if optics are heating up as expected during flight, then the FLIR would tend to switch to the next higher dynamic range and thereby be in the lower end of the dynamic range).

The plot also shows the maximum and minimum points ("BF_hi" and "BF_lo") for each dynamic range (denoted by horizontal bars) which are used to determine when to switch dynamic ranges in the automatic dynamic range adjustment algorithm. Ideally, it would be preferred to have the BF_hi and BF_lo fall inside the two point RE calibrations, but the TRS in the preferred embodiment ATFLIR lacks the range (lacks ability to go very cold) required to facilitate that preference. At least a large range of temperatures (4.1° C. to 38.4° C.) in the typical operating range are covered (i.e., where BF is always within two point RE calibration) since DR=1 and DR=2 share a common RE set. Note that there is approximately 11.8° C. of overlap (BF_hi point to BF_lo point on next higher DR) between dynamic ranges. Typically when slewing between ground and sky, the scene temperature varies while the optics temperature is held constant. In other words, to prevent switching back and forth between dynamic ranges, it is preferred to overlap adjacent dynamic ranges in terms of the scene temperature with the optics temperature held constant. The overlap in scene temperature is roughly equal to 11.8° C. divided by the optics transmission (this is because the plots show optics temperature equal to scene temperature, but we are interested in changing scene temperature away from the optics temperature). In the case of the preferred embodiment ATFLIR, DR overlap of scene temperature is equal to 11.8° C./0.432=27.4° C. The 0.432 factor is the optics transmission of warm elements which includes transmission of the detector dewar window (0.96) and the transmission of system optics outside of the detector (e.g., it equals 0.96*0.45=0.432). Typically at least 25° C. of scene overlap are needed between dynamic ranges.

In summary, the FIG. 4 plot shows the temperatures corresponding to the BF extremes BF_lo(DR), BF_hi(DR), the two RE calibration BF points LE_lo(DR) and RE_hi (DR) and the expected range of BF for the three LE initialization calibrations.

The following sections lettered A through O describe the general design concepts that are applicable to the foregoing discussion as well as derive equations which are used in software algorithms. The general discussion sections are followed by examples derived from the preferred embodiment ATFLIR. In these sections, later referenced general design equations may be numbered "Eqn. X" which is an abbreviation for Equation number X, that may be later referred to.

A. Dynamic Range Definition

Dynamic Range (DR) is defined as the range of BF/temperatures covered when the Staring Detective Assembly (SDA) (see FIG. 1) is in a given Focal Plane Array (FPA) gain state (DA_gain) and integration time (DA_t_int). The FPA creates the multiplexed analog signal for each video pixel, which is amplified by the Command and Control Electronics (C&CE) board. The gain of the C&CE must be controlled to achieve a desired SDA responsivity. The responsivity of the SDA (which is given mV/K) must be defined for a specific DA_gain, DA_t_int and scene temperature, and, the relative gain of each gain state, gain_val, must also be specified.

In the preferred embodiment ATFLIR, DA_gain=0, 1, 2 or 3 and the nominal value of gain for each gain state (gain_val) is 1 for gain state 0, 1.33 for gain state 1, 2.0 for gain state 2 and 3.6 for gain state 3. The integration time, DA_t_int, ranges between 0.032 msec and 16.413 msec (in 2/15.75 msec steps), responsivity at 295 K blackbody scene is nominally 43 mV/K when DA_gain is 0 and DA_t_int is 16.413 msec (C&CE gain is adjusted to achieve this).

B. Number of Level Equalization (LE) Sets

The number of LE sets may be up to the maximum allowed by available system memory, and must be sufficient to cover enough dynamic ranges that would be encountered in a typical mission. Each dynamic range used in a mission must have a separate LE set. Too many LE sets should be avoided due to excessive DR switching between the sets. Note that the total range of scene and optics temperature (Total_Temp_range) covered by any mission is given by the very rough linear approximation:

$$\text{Total\_Temp\_range}=[\text{Optics\_range}*(1-\text{transmission})+\text{scene\_range}*\text{transmission}] \quad \text{Equation 1}$$

In the, preferred embodiment, there is enough RAM for three sets, which is sufficient to cover a typical mission. A typical mission will not require more than 80° C. of scene variation. The largest Total_temp_range required is during a cold soak when the largest expected rise in optics temperature is about 58° C. Knowing that the transmission is 0.432, Equation 1 yields a total range of about 67.5° C. (67.5° C.=58° C.*(1−0.432)+80° C.*0.432). For the colder dynamic ranges 0, 1 and 2, the total range of scene and optics covered is about 68.2° C. as shown in the FIG. 4 (−26.7° C. for DR 0 to 41.5° C. for DR 2). In a hot soak, the optics temperature tends to stay near a constant temperature so fewer dynamic ranges are typically utilized.

C. Number of Dynamic Ranges

It is necessary to cover the number of LE sets in RAM and have extra dynamic ranges if needed to cover the variety of soak conditions encountered on any given mission. Dynamic ranges should not cover more than a BF range of 50% since a RE set would not allow for adequate correction for any larger range.

In the preferred embodiment, 4 dynamic ranges were chosen because one extra dynamic range more than the number of LE sets was required for hot conditions. Since there were 4 gain states, each DR was defined by its gain state, namely: DR=3−DA_gain (notice that larger gain is smaller DR as expected). When in a given DR or DA_gain it is assumed that the appropriate DA_t_int is provided unless stated otherwise. Note that maximum DR, DR_max, is 3, while minimum DR=0.

D. Number of RE Sets:

The number of RE sets can be up to the maximum allowed by system memory and must cover all possible dynamic ranges. If the number of dynamic ranges exceeds the number of RE sets, then some RE sets must cover multiple dynamic ranges. Note that one DR may not have more than one RE set because the LE calibration is only valid for the RE set chosen.

In the preferred embodiment, there are 3 RE sets to cover 4 DRs.

E. Determination of the Minimum Sustainable TRS Cold Temperature (TRS_temp_min) as a Function of Soak Temperature ($T_{soak}$)

A linear equation for TRS_temp_min in terms of $T_{soak}$ (of the form: Cold_gain*$T_{soak}$−Cold_offset; where Cold_ gain is the slope and Cold_offset is the negative of the intercept) sufficiently curve fits to test data. Note that $T_{soak}$ (an unmeasurable value) needs to be replaced by the predicted unpowered TRS temperature at the start of the LE initialization calibration or full RE calibration. To prevent driving below TRS_temp_min, as soon as possible after power-up the pod must simultaneously store unpowered TRS temperature (TRS_temp_initial) and optics temperature (Optics_temp_initial). After the TRS is driven hot or cold, it is necessary to monitor the optics temperature in order to predict the unpowered TRS temperature (TRS_temp_start). It can be assumed that TRS_temp_start will change along with the optics temperature. Note that other alternative methods may be used to prevent driving below TRS_temp_min such as preventing the TRS current from exceeding some specified value. Notation and formulas follow.

Notation:
  TRS_temp is TRS temperature
  TRS_temp_min is the minimum sustainable TRS cold temperature
  $T_{soak}$ is temperature at which unit was soaked (thermal equilibrium)

Formulation:

$$TRS\_temp\_start = TRS\_temp\_initial + (Optics\_temp - Optics\_temp\_initial) \qquad \text{Equation 2}$$

$$TRS\_temp\_min = Cold\_gain * TRS\_temp\_start - Cold\_offset \qquad \text{Equation 3}$$

In the preferred embodiment, Equations 2 and 3 are used in the software algorithms of the initialization LE and full RE calibrations. TRS_temp_min(° C.) in Equation 3 is 0.91*TRS_temp_start−21.3° C. (i.e., Cold_gain is 0.91, Cold_offset is 21.3° C.). The optics temperature is monitored in the receiver in Kelvin and is called rec_temp and TRS_temp is monitored in ° C. Therefore, Equation 2 becomes:

$$TRS\_temp\_start = TRS\_temp\_initial(° C.) + [rec\_temp(K) - optics\_temp\_initial(K)] * 1° C./K \qquad \text{Equation 3}$$

F. Choosing Integration Time (DA_t_int) for Each DR and BF_hi(DR_max)

Initially, select maximum integration time for all DR's for best performance (lower noise). Under the coldest conditions when BF=BF_coldest, if BF_coldest+0.50 (note that BF range of 0.50 is largest dynamic range allowed) is greater than the maximum BF without any saturation, BF_max, then the integration time must be reduced. BF_coldest is determined by a computer mathematical model (a Mathcad Model) given the optics temperature and scene temperature. The setting of integration time is highly dependent on the optical fno (fno is the ratio of effective focal length to entrance pupil diameter), since the photon flux detected is proportional to $1/fno^2$. A higher fno will thus require a higher integration time to make up for lower photon flux. If possible, a common integration time is desirable for the coldest and middle dynamic ranges. For DR set to maximum (DR_max) when DA_gain is at a minimum, reduce integration time so that when under extreme hot soak ($T_{soak} = T_{max}$) while looking at the TRS at minimum sustainable temperature (TRS_temp_min), BF must be less than BF_max. Also, BF must be less than BF_max for the worst case optics and scene temperature after the allowed operational readiness time to achieve full performance has elapsed. It will be apparent to those skilled in that art that BF_hi(DR_max) must be set equal to BF_max to achieve good performance. There must be some built in margin (i.e., BF<BF_max for a nominal system) to prevent saturation and to cover the tolerances in SDA responsivity and optics transmission. Testing can be employed to determine the actual optics emissivity (the model assumes highest possible optics emissivity=1−transmission) to find out how much margin actually exists. Notation and formulas are as follows:

Notation:
  BF is Bucket Fill which is a fraction of the video A–D range
  DR is Dynamic Range (FLIR has a set gain state and integration time),
  DR=0 is minimum DR at minimum temperature/maximum gain.
  DR_max is the maximum DR at maximum temperature/minimum gain.
  BF_min is the minimum usable BF
  BF_max is the maximum BF with no saturation
  BF(DR) is the BF when dynamic range is set to DR
  BF_lo(DR) is the smallest BF allowed when in dynamic range DR
  BF_hi(DR) is the largest BF allowed when in dynamic range DR
  BF_coldest is the lowest BF expected when cold soaked and DR=0 after operational readiness time has elapsed $$BF\_hi(DR\_max) = BF\_\text{is maximum } BF \text{ without saturation} \qquad \text{Equation 4}$$

In the preferred embodiment, BF_max=0.78 (rough estimate). Using Equation 4, this yields BF_hi(3) 0.78. BF_coldest=0.11 is possible 15 minutes (maximum operational readiness time for full performance) after turn on under cold soak conditions (scene at −40° C., optics at −32.2° C.). Since BF_coldest+0.50<BF_max, the maximum integration time (16.413 msec) may be used for DR=0. To keep a common integration time in the middle dynamic ranges (DR at 1 and 2), maximum integration time (16.413 msec) is chosen. Under an extreme hot soak, Tmax=71° C., Topt=68.5° C. and BF_max=0.78 which is the maximum desired BF. For ATFLIR DA_t_int=14.508 msec was chosen for DR=3, resulting in BF=0.767 for a nominal system under extreme hot soak looking at a cold TRS at TRS_temp_min. Also, 15 minutes after turn on under a hot soak the expected maximum temperatures are $T_{opt}=66°$ C. and $T_{scene}=47°$ C., resulting in an expected BF=0.759. The worst case condition during testing is when $T_{opt}=70.1°$ C. and $T_{scene}=40°$ C. and the expected BF is 0.775. There is very little built in margin based on the model. The actual margin is higher since the model assumed a worst case (highest possible) optics emissivity.

G. Select Lowest Reasonable BF for BF_lo(0)

First, determine BF for coldest expected scene (BF_coldest) under minimum DR (DR=0, maximum gain state) after allowed time for full performance. In choosing the most reasonable minimum BF (BF_min) the BF may be increased (above BF_coldest) if the optics warm up quickly after turn on. BF_lo(0) will be set equal to BF_min.

$$BF\_lo(0) = BF\_min \qquad \text{Equation 5}$$

In the preferred embodiment ATFLIR, as shown above, BF_coldest=0.11 was possible fifteen minutes after turn on under a cold soak (scene at −40° C., optics at −32.2° C.). The ATFLIR optics heat up very quickly when cold soaked so that about 25 to 30 minutes after turn on under a cold soak (scene at −40° C., optics at −20.1° C.), BF=0.15 may be expected. Therefore, select BF_min=0.15 and, using Equation 5 yields BF_lo(0)=0.15.

H. Match RE Sets to Dynamic Ranges

If the number of dynamic ranges exceed the number of RE sets, because of system memory constraints, then first pair up adjacent middle dynamic ranges with a single RE set. Leaving the high and low end dynamic ranges with a single RE set is preferable because the hottest and coldest dynamic ranges tend to be the largest due to the attempt at covering the extreme conditions.

Notation:

RE_DR is Range covered by a single RE set.

If one RE set covers one dynamic range then RE_DR=DR. If one RE set covers two dynamic ranges (DR1 and DR2 where DR1 is the lower dynamic range and DR2=DR1+1) then RE_DR=DR1.

In the preferred embodiment ATFLIR there are three RE sets for four dynamic ranges. Since the hottest (highest) and coldest (lowest) DR tend to require the biggest range, one RE set each is used for the extreme dynamic ranges (DR=0 and DR=3) and the middle dynamic ranges (DR=1 and DR=2) share a common RE set (RE_DR=1).

I. Finding Remaining Values for BF_hi(DR) and BF_lo(DR)

One requirement is that each of the RE sets cover an equal spread in BF (BF_RE_range) and that dynamic ranges (DR1 and DR2) with a common RE set have the same BF range (BF_common_range). For ease of formulation of the general design, it is assumed that a one to one correspondence exists between DR and DA_gain where DR_max corresponds to gain state 0 and that the relative gain when in DR_max (gain_val(DR_max)) is 1. The notation and formulas summary follow.

Notation:

DR1 is the lower dynamic range covered by RE_DR (also can be any DR when comparing two DRs)

DR2 is the upper dynamic range covered by RE_DR & DR2=DR1+1 (also can be any DR when comparing two DRs)

RE_DR is the range covered by one RE set (numbered RE_DR) where, RE_DR=DR if 1 DR per RE set, RE_DR=DR1 if 2 DRs per RE set T is the temperature T[BF(DR)] is the temperature of scene & optics when at BF=BF(DR), assume $T_{scene}=T_{optics}$ DA_gain is the gain state DA_t_int is the integration time DA_gain(DR) is the gain state for a given DR DA_t_int(DR) is the integration time for a given DR Gain_val(DR) is the relative gain of DA_gain(DR)

Formulation:

$$Gain\_val(DR\_max)=1 \qquad \text{Equation 6}$$

If 1 RE set per 1 DR (RE_DR=DR):

$$BF\_hi(DR)-BF\_lo(DR)=BF\_RE\_range \qquad \text{Equation 7}$$

If 1 RE set per 2 DRs (RE_DR=DR1):

$$BF\_hi(DR2)-BF\_lo(DR1)=BF\_RE\_range \qquad \text{Equation 8}$$

$$BF\_hi(DR2)-BF\_lo(DR2)=BF\_hi(DR1)-BF\_lo(DR1)=BF\_common\_range \qquad \text{Equation 9}$$

Knowing the relative gain of each dynamic range (a combination of gain state and integration time) and requiring that there be a constant scene overlap of 25° C. to 30° C. between adjacent dynamic ranges allows solving for the remaining values of BF_lo(DR) and BF_hi(DR) using steps a), b) and c) below.

First in step a), solve for BF_hi(DR), BF_lo(DR+1), BF_lo(DR), and BF_hi(DR-1) where RE_DR=DR (i.e., 1 DR per RE set). Initially, choose a scene overlap (i.e., $T_{optics}$ stays constant while $T_{scene}$ is varying) between adjacent dynamic ranges of 27.5° C. (this is equivalent to overlap of (27.5° C.*(transmission of warm optics)) when changing both scene and optics). BF_hi(DR) and BF_lo(DR) for dynamic ranges with a single RE set are then found via an iterative routine of setting BF_RE_range, using the scene overlap to find BF_lo(DR+1) or BF_hi(DR-1), calculating the spread covered by the dynamic ranges with a common RE set, and then repeat the entire loop each time resetting BF_RE_range (reset based on formulation of original BF_RE_range and range calculated from common RE set) with the goal of creating an equal spread (BF_RE_range) for all RE sets to cover.

Next in step b), solve for BF_hi(DR1) and BF_lo(DR2) where RE_DR_DR1 (i.e., dynamic ranges sharing a common RE set). Use iterative routine of setting BF_common range, finding the overlap created between shared dynamic ranges, and then repeating the loop with the goal of ending up with the desired overlap (note that the loop has to be repeated twice to obtain a low overlap and a high overlap before one can reset BF_common_range based on interpolation). In an alternative procedure one may set BF_common_range for the lower DR (DR1) to find BF_hi (DR1), use the desired overlap to find BF_lo(DR2) which would then be used to find a new value for BF_common_range (for DR2). Reset BF_common_range as an average of the original DR1 value and the new DR2 value.

Lastly in step c), round all values of BF_lo(DR), BF_hi(DR), Delta_BF_lo and Delta_BF_hi to the nearest LSB. Also, keep BF_RE_range constant and BF_common_range constant by adjusting values by 1 LSB. A summary of formulas follows. The first equation, Equation 10, combines the two dynamic range gain functions of integration time and gain state into a single variable Gain(DR).

$$Gain(DR)=Gain\_val(DR)*DA\_t\_int(DR) \qquad \text{Equation 10}$$

$$Total\_overlap=27.5° \text{ C.*(transmission of warm optics)}$$

If RE_DR=DR (1 RE set for 1 DR; Eqn. 13 derived from Eqn. 12 with DR=DR-1):

$$T[BF\_lo(DR)]=T[BF\_lo(DR+1)]+Total\_overlap \qquad \text{Equation 12}$$

$$T[BF\_lo(DR)]=T[BF\_hi(DR-1)]-Total\_overlap \qquad \text{Equation 13}$$

If RE_DR=DR1 (1 RE set for 2 DRs):

$$Total\_overlap=T[BF\_hi(DR1)]-T[BF\_lo(DR2)] \qquad \text{Equation 14}$$

Use of the equations above is then broken into the step a), b) and c), which follow. Formulation will assume 4 to 8 DRs, 3 to 6 RE sets 1 or 2 of which will cover 2 middle DRs. This same process may be generalized for more DRs/RE sets or simplified if less than 4 DRs are used.

Step a): Routine for Finding BF_RE_Range:

Notation for Step a):

BF_RE_range_0 is the BF_RE_range first guess and successive iteration value

BF_RE_range_i is the model-calculated value of $i^{th}$ RE set covering 2 DRs.

m is the number of RE sets that cover a single DR each.

n is the number of RE sets that cover 2 DRs each.

Process and Formulation for Step a):

Guess at BF_RE_range_0

Use Equation 7 (with DR=0, BF_RE_range=BF_RE_range_0 and BF_lo(0)=BF_min from Equation 5) to find BF_hi(0).

Use Equation 7 (with DR=DR_max, BF_RE_range=BF_RE_range_0 and BF_hi(0)=BF_max from Equation 4) to find BF_lo(DR_max).

Knowing BF_hi(0) and BF_lo(DR_max), use Equations 11 through 13 and Mathcad model to find BF_lo(1) and BF_hi(DR_max−1). If using 3 RE sets with 4 DRs, then use Equation 8 with DR1=1, DR2=DR_max−1=2 to find BF_RE range which is then set equal to BF_RE_range_i where i=1.

If more than 3 RE sets are used and 1 RE set covers only DR=2 and/or 1 RE set covers only DR=DR_max−1, then repeat above process using the same guess for BF_RE_range_0 (know BF_lo(1) and BF_hi(DR_max−1) when applying Equation 7 to find BF_hi(1) and BF_lo(DR_max−1) and using Equations 11 through 13 and Mathcad model to find BF_lo(2) and BF_hi(DR_max−2)). If less than 7 DRs and only 1 RE set covers 2 DRs, then use Equation 8 and above BF values to find BF_RE_range which is then set equal to BF_RE_range_i where i=1.

If 2 RE sets cover 2 DRs each (i.e., n=2), then do as follows: For i=1 let BF_RE_range1=BF_RE_range_0 for the lower of the middle DRs (DR1 and DR2). Knowing BF_lo(DR1) from previous steps, use Equation 8 with BF_RE_range=BF_RE_range_1 to solve for BF_hi(DR2). Let DR3 and DR4 be the DRs covered by the other RE set (i=2) where DR3=DR2+1 and DR4=DR3+1. Knowing BF_hi(DR2), use Equations 11 through 13 and Mathcad model (in equations let DR2=DR3 and DR1=DR2) to find BF_lo(DR3). Knowing BF_lo(DR3) and BF_hi(DR4) from a previous step, use Equation 8 (let DR1=DR3 and DR2=DR4) to find BF_RE_range which is then set equal to BF_RE_range_2.

Since number of DR=DR_max+1 (remember minimum DR=0), n may be calculated from m as:

$$n = (DR\_max + 1 - m)/2 \qquad \text{Equation 15}$$

Weighting factors involving m and n are then applied to BF_RE_range_0 and BF_RE_range_i below to create the new value of BF_RE_range_0 in Eqn. 16.

$$BF\_RE\_range\_0 = \left(m * BF\_RE\_range\_0 + \sum_{i=1}^{n} BF\_RE\_range\_i\right)/(n+m) \qquad \text{Equation 16:}$$

The routine above is repeated as necessary to converge on a final value of BF_RE_range (which should equal the final values of BF_RE_range_0 and BF_RE_range_i).

Step b): Routine Used to Find BF_hi(DR1) and BF_lo(DR2) for Pairs of DRs Having a Common RE Set.

Notation for Step b):

Lap_lo is Equation 14 calculated Total overlap value which is lower than that calculated in Equation 11

Lap_hi is Equation 14 calculated Total overlap value which is higher than that calculated in Equation 11

Range_lo is Range when BF_common_range (guessed or calculated) was low & produced Lap_lo Range_hi is Range when BF_common_range (guessed or calculated) was high & produced Lap_hi BF_common_range_0 (used in alternative process) is the BF_common_range first guess for DR1 and successive iteration value BF_common_range_1 (used in alternative process) is the calculated value of BF_common_range for DR2.

Process and Formulation for Step b):

Guess at BF_common_range.

Use Equation 9 to find BF_hi(DR1) and BF_lo(DR2).

Calculate total overlap using Equation 14.

If total overlap is low then

Range_lo=BF_common_range and lap_lo=Total_overlap.

Choose larger value of BF_common range so that Total_overlap (use Equations 9 and 14 per above steps) will be high.

If total overlap is high then

Range_hi=BF_common_range and lap_hi=Total_overlap.

Choose smaller value of BF_common_range so that Total_overlap (use Equations 9 and 14 per above steps) will be low.

Interpolate new value for BF_common_range as:

$$BF\_common\_range = Range\_lo + (Range\_hi - Range\_lo)*(Total\_overlap - lap\_lo)/(lap\_hi - lap\_lo) \qquad \text{Equation 17}$$

Find new value of overlap (use Eqn. 9 and 14) using BF_common_range calculated in Equation 17

Repeat steps above until value of Total_overlap calculated using Equation 14 equals value calculated in Equation 11 (difference within half of a LSB).

Alternative Process and Formulation for Step b):

Guess at BF_common_range=BF_common_range_0.

Knowing BF_lo(DR1), use Eqn. 9 to find BF_hi(DR1)

Use Equations 11 through 13 and Mathcad model to find BF_lo(DR2)

Knowing BF_lo(DR2) and BF_hi(DR2) from step a), use Eqn. 9 to find BF_common_range and set this equal to BF_common_range_1

Iteration formula:

$$BF\_common\_range\_0 = (BF\_common\_range\_0 + BF\_common\_range\_1)/2 \qquad \text{Eqn. 17a}$$

Repeat process until the difference of BF_common_range_1 and BF_common_range_0 is within half of a LSB.

Step c): Round to Nearest LSB:

General method for variable X: LSB*Round(X/LSB,0) where Round(Z,0)=Z rounded to nearest integer.

Further details of BF calculations follow and assist as an introduction to upcoming General Design steps. A computer model (Mathcad or any application which performs integrals and derivatives may be used) is required to integrate photon flux over the operating wavelengths in order to translate temperature (combination of scene and optics and for now assume optics temperature=scene temperature) into bucket fill. The photon flux of the scene is then multiplied by the optical gain which is the optics transmission divided by $4fno^2$. The SDA responsivity are also required in the calculation. If the emissivity of the optics is not known, assume emmisivity=(1−transmission of warm optics). Emissivity of the TRS surface and the scene are assumed to equal 1. Also, the flux is averaged over the entire array to account for the FPA pixel signal varying as $\cos^4(\theta)$ (where $\theta$ is the angle between the following two vectors—1 from coldshield center to FPA center 2 from coldshield center to FPA pixel) from the coldshield affect. Translating BF from one dynamic range (DR1) to another dynamic range (DR2) may be calculated knowing that the change in BF is proportional to gain.

Notation:
BF_null is the expected BF when there is no photon flux
Gain_ratio is the ratio of gain for 2 DR. As an equation:

$$\text{Gain\_ratio} = \text{Gain}(DR2)/\text{Gain}(DR1) \quad \text{Equation 18}$$

Formulation follows:
Using Equation 10, Equation 18 may be rewritten as:

$$\text{Gain\_ratio} = [\text{Gain\_val}(DR2)/\text{Gain\_val}(DR1)]*[DA\_t\_int(DR2)/DA\_t\_int(DR1)] \quad \text{Equation 18a}$$

Because Delta_BF is proportional to gain:

$$\text{Delta\_}BF(DR)/\text{Gain}(DR) = \text{constant or} \quad \text{Equation 19}$$

Plugging in Delta_BF(DR) as the change in BF from the no photon flux value:

$$[BF(DR) - BF\_\text{null}]/\text{Gain}(DR) = \text{constant} \quad \text{Equation 19a}$$

For 2 DR (DR1 and DR2) Equation 19a may be rewritten as:

$$[BF(DR2) - BF\_\text{null}]/\text{Gain}(DR2) = [BF(DR1) - BF\_\text{null}]/\text{Gain}(DR1) \quad \text{Equation 20}$$

Solving for BF(DR2) and using Equation 18 yields:

$$BF(DR2) = \text{Gain\_ratio}*[BF(DR1) - BF\_\text{null}] + BF\_\text{null} \quad \text{Equation 21}$$

In the preferred embodiment, the forgoing approach in step a) (using Equations 8, 10–13 & 16) and step b) (using Equations 9, 11, 14 & 17) were applied. Note that the Mathcad model incorporates the material in Sections A (nominal gain_val(DA_gain) for gain states 0, 1, 2 and 3 and responsivity definition), C (DR_max=3 and DR=3−DA_gain), F (default DA_t_int for each DR) and G and Equations 6 (with DR_max=3), 10 and 21 (with Gain_ratio defined by Equation 18a and nominal value of BF_null= 0.04) from this section (I). The results are tabulated below:

| DR | 0 | 1 | 2 | 3 |
|---|---|---|---|---|
| BF_lo(DR) | 0.15 | 0.23187 | 0.29159 | 0.3285 |
| T[BF_lo(DR)] | −26.711 | −2.227 | 14.653 | 29.757 |
| BF_hi(DR) | 0.6015 | 0.6236 | 0.68332 | 0.78 |
| T[BF_hi(DR)] | 9.653 | 26.533 | 41.637 | 59.788 |

Then, the final BF extremes were corrected based on an LSB of 0.005, so following the general rules for step c) results in the final table below:

| DR | 0 | 1 | 2 | 3 |
|---|---|---|---|---|
| BF_lo(DR) | 0.15 | 0.23 | 0.29 | 0.33 |
| BF_hi(DR) | 0.60 | 0.62 | 0.68 | 0.78 |

J. Method to Find DR_initial

Essentially, it is preferable to make the transition point between DR and DR+1 at equal distance in temperature from T[BF_hi(DR)] and T[BF_lo(DR+1)].

Notation:
BF_hi_switch(DR) is ideal BF below BF_hi(DR) where DR_initial should be switched to DR+1
BF_lo_switch(DR) is ideal BF above BF_lo(DR) where DR_initial should be switched to DR−1
Delta_BF_hi(DR) is amount of BF delta below BF_hi(DR) to reach BF_hi_switch(DR)
Delta_BF_lo(DR) is amount of BF delta above BF_lo(DR) to reach BF_lo_switch(DR)

Formulation:
Similar to Equation 12 and 13 using definitions above:

$$T[BF\_hi\_\text{switch}(DR)] = T[BF\_hi(DR)] - \text{Total\_overlap} \quad \text{Equation 22}$$

$$T[BF\_lo\_\text{switch}(DR)] = T[BF\_lo(DR)] + \text{Total\_overlap} \quad \text{Equation 23}$$

Based on the definitions of Delta_BF_hi and Delta_BF_lo:

$$\text{Delta\_}BF\_lo(DR) = BF\_lo\_\text{switch}(DR) - BF\_lo(DR) \quad \text{Equation 24}$$

$$\text{Delta\_}BF\_lo(DR) = BF\_lo\_\text{switch}(DR) - BF\_lo(DR) \quad \text{Equation 25}$$

Delta_BF_lo(DR) and Delta_BF_hi(DR) will likely turn out to be constants independent of DR. If Delta_BF_lo(DR) is nearly constant then taking an average over the applicable dynamic ranges yields:

$$\text{Delta\_BF\_lo} = \left[\sum_{DR=1}^{DR\_max} \text{Delta\_BF\_lo}(DR)\right] / \quad \text{Equation 26:}$$

DR_max and round to nearest LSB $$\text{Delta\_BF\_hi} = \left[\sum_{DR=0}^{DR\_max-1} \text{Delta\_BF\_hi}(DR)\right] / \quad \text{Equation 27:}$$

DR_max and round to nearest LSB $$\text{Delta\_}BF\_lo = \text{constant if } ABS(\text{Delta\_}BF\_lo - \text{Delta\_}BF\_lo(DR)) < 1.5 LSB \text{ for all } DR \quad \text{Equation 28}$$

$$\text{Delta\_}BF\_hi = \text{constant if } ABS(\text{Delta\_}BF\_hi - \text{Delta\_}BF\_hi(DR)) < 1.5 LSB \text{ for all } DR \quad \text{Equation 29}$$

In order to find DR_initial, choose DR that would be appropriate to room ambient from about 20° C. to 25° C. If the room ambient DR is in between two dynamic ranges, select the lower DR (higher gain and BF which equate to lower noise) for better performance. The general algorithm for setting DR thus lets DR_initial=DR appropriate at room ambient and then keeps switching DR until BF_lo(DR)+Delta_BF_lo<BF<BF_hi(DR)−Delta_BF_hi, or until it reaches minimum DR (DR=0) or maximum DR (DR_max). In the software algorithm, the BF is an average of several readings (noise reduction technique) and is called BF_avg_filtered. Also, it is assumed that the proper RE set for the given DR is used and switched along with the DR.

Calculations on the preferred embodiment below are based on the unrounded BF values since [BF_hi(DR)] and T[BF_lo(DR)]) are known. Equations 22 and 23 along with the Mathcad model are used to calculate BF_lo_switch(DR) and BF_hi_switch(DR) for all DR.

Applying Eqn. 23 when $DR = 3$ yields:

$$T[BF\_lo\_switch(3)] = 29.757° \text{ C.} + 11.88° \text{ C.}/2 = 35.697° \text{ C.,}$$

-continued which corresponds to BF_lo_switch(3) = 0.39250.

Applying Eqn. 22 when $DR = 2$ yields:

$T[\text{BF\_hi\_switch}(2)] = 41.637°\ C. - 11.88°\ C./2 = 35.697°\ C.$, which corresponds to BF_lo_switch(2) = 0.57038.

Applying Eqn. 23 when $DR = 2$ yields:

$T[\text{BF\_lo\_switch}(2)] = 14.653°\ C. + 11.88°\ C./2 = 20.593°\ C.$, which corresponds to BF_lo_switch(2) = 0.35380.

Applying Eqn. 22 when $DR = 1$ yields:

$T[\text{BF\_hi\_switch}(1)] = 26.533°\ C. - 11.88°\ C./2 = 20.593°\ C.$, which corresponds to BF_hi_switch(1) = 0.51189.

Applying Eqn. 23 when $DR = 1$ yields:

$T[\text{BF\_lo\_switch}(1)] = -2.227°\ C. + 11.88°\ C./2 = 3.713°\ C.$, which corresponds to BF_lo_switch(1) = 0.28588.

Applying Eqn. 22 when $DR = 0$ yields:

$T[\text{BF\_hi\_switch}(0)] = 9.653°\ C. - 11.88°\ C./2 = 3.713°\ C.$, which corresponds to BF_hi_switch(0) = 0.48258.

Equations 24 through 29 are used to calculate Delta_BF_lo and Delta_BF_hi below: LSB is 0.005 for Delta_BF_hi(DR) and Delta_BF_lo(DR).

Using Equation 24 yields:

Delta_BF_hi(2)=BF_hi(2)−BF_hi_switch(2)= 0.68332−0.57038=0.11294

Delta_BF_hi(1)=BF_hi(1)−BF_hi_switch(1)= 0.6236−0.51189=0.11171

Delta_BF_hi(0)=BF_hi(0)−BF_hi_switch(0)= 0.6015−0.48258=0.11892

Applying Equation 27 yields: Delta_BF_hi=0.11452 which rounds up to 0.115. Delta_BF_hi=0.115 is within 0.00392 over all DR<1.5 LSB=0.0075 so Delta_BF_hi is constant based on Equation 29 criteria.

Using Equation 25 yields:

Delta_BF_lo(3)=BF_lo_switch(3)−BF_lo(3)= 0.39250−0.3285=0.064

Delta_BF_lo(2)=BF_lo_switch(2)−BF_lo(2)= 0.35380−0.29159=0.06221

Delta_BF_lo(1)=BF_lo_switch(1)−BF_lo(1)= 0.28588−0.23187=0.05401

Applying Equation 26 yields:

Delta_BF_lo=0.06007 which rounds down to 0.060 Delta_BF_lo=0.060 is within 0.00599 over all DR<1.5 LSB=0.0075, therefore Delta_BF_lo is constant based on Equation 28 criteria.

20.6° C. is the approximate transition set point between setting DR=1 and DR=2. Since room ambient is in between two DR, the preferred embodiment ATFLIR chooses the lower DR value of 1 to be the first guess at DR_initial.

K. Readjustment of BF_lo(DR) and BF_hi(DR) Based on Loose Gain/Null Tolerances

If the relative gain between dynamic ranges is not controlled closely enough, then it may be desirable to perform a gain calibration and then change BF_lo(DR) and BF_hi(DR) to keep the overlap between dynamic ranges constant. This gain calibration depends on the specific hardware and should only be required during a maintenance action as part of the full RE calibration. The gain calibration should compare the gain of one reference dynamic range (namely DR_max because gain_val(DR_max)=1 in Equation 6) to that of the rest of the dynamic ranges. The BF_lo(DR) and BF_hi(DR) may be modified by a simple linear equation that is derived below.

Notation:

BF related variables from the model used in establishing the design for a nominal system are denoted with the prefix "Old_" and the actual value used in a real system upon calibration shall be denoted with the prefix "New_".

Formulation:

The equation for converting from an old gain (Old_gain) to a new gain (New_gain) is similar to calculating BF for another dynamic range and may be derived from Equation 20 by setting DR2 variables to New_ and DR1 variables to Old_ and solving for the gain_ratio, which yields:

$$(\text{New}\_BF - BF\_\text{null})/(\text{Old}\_BF - BF\_\text{null}) = \text{New}\_\text{gain}/\text{Old}\_\text{gain} \qquad \text{Equation 30}$$

Solving for New_BF in Eqn. 30 yields:

$$\text{New}\_BF = BF\_\text{null} + (\text{Old}\_BF - BF\_\text{null}) * \text{New}\_\text{gain}/\text{Old}\_\text{gain} \qquad \text{Equation 31}$$

The equation above assumes that BF_null is constant. Because BF_null may vary with each system, all BF related parameters must be corrected for changes in BF_null from Old_BF_null to New_BF_null (the model must assume a nominal value for BF_null=Old_BF_null which may be different from the actual BF_null=New_BF_null). To correct Old_BF for BF_null changes do as follows:

$$\text{Old}\_BF\_\text{null}\_\text{corrected} = \text{Old}\_BF\_\text{null} - \text{Old}\_BF\_\text{null} \qquad \text{Equation 32}$$

In Eqn. 31, let Old_BF=Old_BF_null corrected & BF_null=New_BF_null yielding:

$$\text{New}\_BF = (\text{Old}\_BF\_\text{null}\_\text{corrected} - \text{New}\_BF\_\text{null}) * \text{New}\_\text{gain}/\text{Old}\_\text{gain} + \text{New}\_BF\_\text{null} \qquad \text{Equation 33a}$$

Plugging Equation 32 into Equation 33a yields:

$$\text{New}\_BF = \text{New}\_BF\_\text{null} + (\text{Old}\_BF - \text{Old}\_BF\_\text{null}) * \text{New}\_\text{gain}/\text{Old}\_\text{gain}$$

Equation 33b (or Equation 32 with Equation 33a) may be used to reset the key design parameters BF_lo(DR), BF_hi(DR), LE_lo(RE_DR) and RE_hi(RE_DR) for any change in gain (DA_t_int, responsivity or gain_val(DR)) or BF_null. To correct BF_lo(DR), in Equation 33b, set New_BF=New_BF_lo(DR), Old_BF=Old_BF_lo(DR) and let:

$$\text{New}\_\text{gain}/\text{Old}\_\text{gain} = \text{New}\_\text{gain}(DR)/\text{Old}\_\text{gain}(DR) = \text{Gain}\_\text{ratio}(DR) \qquad \text{Equation 34}$$

Which yields:

$$\text{New}\_BF\_lo(DR) = \text{New}\_BF\_\text{null} + (\text{Old}\_BF\_lo(DR) - Id\_BF\_\text{null}) * \text{Gain}\_\text{ratio}(DR) \qquad \text{Equation 35}$$

To correct BF_hi(DR), in Equation 33b, set New_BF=New_BF_hi(DR), Old_BF=Old_BF_hi(DR) and let New_gain/Old_gain=New_gain(DR)/Old_gain(DR)=Gain_ratio(DR) yielding:

$$\text{New}\_BF\_hi(DR) = \text{New}\_BF\_\text{null} + (\text{Old}\_BF\_hi(DR) - Id\_BF\_\text{null}) * \text{Gain}\_\text{ratio}(DR)$$

It can be shown that Delta_BF_lo(DR) and Delta_BF_hi(DR) also depend on gain. To maintain the same temperature rise (approximately 27.5° C.*transmission of warm optics/2) between BF_lo(DR) to the BF for switching from DR−1 to DR (i.e., BF_lo_switch(DR)), BF_lo_switch (DR) must change as follows (Eqn. 33b becomes Eqn. 37, Eqn. 25 becomes Eqn. 38 and Eqn. 24 becomes Eqn. 39):

$$\text{New\_}BF\_lo\_\text{switch}(DR)=(\text{Old\_}BF\_lo\_\text{switch}(DR)-\text{Old\_}BF\_\text{null})*\text{Gain\_ratio}(DR)+\text{New\_}BF\_\text{null} \quad \text{Equation 37}$$

$$\text{Old\_}BF\_lo\_\text{switch}(DR)=\text{Old\_}BF\_lo(DR)+\text{Old\_Delta\_}BF\_lo(DR) \quad \text{Equation 38}$$

$$\text{New\_Delta\_}BF\_lo(DR)=\text{New\_}BF\_lo\_\text{switch}(DR)-\text{New\_}BF\_lo(DR) \quad \text{Equation 39}$$

Plugging in Equation 38 into Equation 37 yields:

$$\text{New\_}BF\_lo\_\text{switch}(DR)=(\text{Old\_}BF\_lo(DR)+\text{Old\_Delta\_}BF\_lo(DR)-\text{Old\_}BF\_\text{null})*\text{Gain\_ratio}(DR)+\text{New\_}BF\_\text{null} \quad \text{Equation 40}$$

Plugging in Equation 35 and Equation 40 into the Equation 39 yields:

$$\text{New\_Delta\_}BF\_lo(DR)=\text{Old\_Delta\_}BF\_lo(DR)*\text{Gain\_ratio}(DR) \quad \text{Equation 41}$$

In the case where it is desirable for New_Delta_BF_lo (DR) to be constant for all DR (i.e., drop (DR)), then take an average over all applicable DR (ignore DR=0 since it is not possible to switch from DR=−1) or in other words combine Equation 26 and 41 to yield:

$$\text{New\_Delta\_BF\_lo} = \text{Old\_Delta\_BF\_lo} * \left[\sum_{DR=1}^{DR\_max} \text{Gain\_ratio}(DR)\right]/DR\_max \quad \text{Equation 42:}$$

Similarly, the same process may be used to find New_Delta_BF_hi(DR) yielding:

$$\text{New\_Delta\_}BF\_hi(DR)=\text{Old\_Delta\_}BF\_hi(DR)*\text{Gain\_ratio}(DR) \quad \text{Equation 43}$$

For the case that New_Delta_BF_hi is a constant, the applicable DRs for averaging is from 0 to DR_max−1 (because DR is switched from DR+1) or combining Equation 27 and 43 yields:

$$\text{New\_Delta\_BF\_hi} = \text{Old\_Delta\_BF\_hi} * \left[\sum_{DR=0}^{DR\_max-1} \text{Gain\_ratio}(DR)\right]/DR\_max \quad \text{Equation 44:}$$

Respecting the preferred embodiment ATFLIR, the following equations are used in the software algorithms of the gain calibration: Equations 32 and 33a (or 35 and 36) are used to readjust BF_lo(DR) and BF_hi(DR). Equations 42 and 44 are used to readjust Delta_BF_lo and Delta_BF_hi respectively. The equations above depend on measuring the unit specific values of BF_null and Gain_ratio(DR) which are found in the details of the detector gain state calibration in section M.

L. Method for Establishing the 2 BF points for the RE Calibration

The 2 BF points for the RE calibration consist of a LE calibration at one BF point and a RE calibration at the second point. The LE first adjusts the level of each pixel (with midscale gain) until the level of all pixels is at the initial average value. The RE is calculated based on changing the gain of each pixel until the difference in BF (high—low) for each pixel is at an average value. The main requirement of the calibration is that there be a sufficient difference between the LE BF and the RE BF and that the LE and RE calibrations be done with the same gain state and integration time. Also, the LE and RE calibrations must be done relatively close together in time during the same power on cycle (to prevent excessive optics temperature changes which would change the fixed pattern noise and invalidate the LE low calibration). In general, it would be preferable to do the LE at low bucket fill because the gain state and integration time can be set lower if the optics is too hot or the TRS is not able to achieve a low enough BF (limitation of TRS_temp_min and optics emissivity and optics cooling mechanism). Hence the low BF point is referred to as LE_lo(RE_DR) where RE_DR is the set being calibrated (this set may cover multiple DR) which may be different than the present DR of the FLIR. The calibration at BF=LE_lo(RE_DR) of one RE_DR is called the LE low calibration. The final RE calculation occurs at high BF, hence the high BF point is referred to as RE_hi(RE_DR) and the calibration of one RE_DR is called the RE high calibration. The full RE calibration refers to calibrating RE sets for all RE_DR (i.e., one LE low calibration and one RE high calibration performed for each RE_DR). Full RE calibration may be commanded manually or automatically if hardware was changed from a maintenance action (see Section O under pre-calibration).

The process of establishing LE_lo(RE_DR) and RE_hi (RE_DR) is now considered. To achieve low fixed pattern noise over the full dynamic range, it is preferable to set LE_lo(RE_DR)=BF_lo(RE_DR) and RE_hi(DR)=BF_hi(RE_DR) (note that if RE_DR covers 2 DR then BF_lo(RE_DR)=BF_lo(DR1) and BF_hi(RE_DR)=BF_hi (DR2)) and set the BF during LE initialization calibration midway between BF_lo(DR) and BF_hi(DR) (i.e., BF=[BF_lo(DR)+BF_hi(DR)]/2). Even though the LE_lo (RE_DR) could always be achieved by lowering the gain state and integration time, the TRS may not have the range required to achieve RE_hi(DR) since reducing integration time (DA_t_int) and gain (gain_val(DR)) will reduce the gain of the TRS (gain of TRS may be defined as the derivative dBF/dTtrs which is directly proportional to gain_val(DR), DA_t_int, SDA responsivity, (system optics transmission)/4fno$^2$ and the temperature derivative of photon flux). In the case where the TRS does not have the range to reach RE_hi(DR), it is necessary to keep Delta_BF_RE=RE_hi(DR)−LE_lo(DR) as large as possible (what the TRS can achieve under warm room ambient conditions of 25 to 30° C. so that cold soaking the pod during full RE calibration is not required) by placing limits to the reduction in integration time and/or gain. With a limited TRS range, larger Delta_BF_RE, will result by raising gain/integration time until RE_hi(RE_DR) is achievable, beyond which would lower Delta_BF_RE due to sacrificing LE_lo(RE_DR).

As a minimum requirement, when DR_initial is established (via Section J algorithms) during LE initialization, the BF should be inside the 2 point RE (i.e., LE_lo(RE_DR) <BF<RE_hi(RE_DR)) except under the extreme hot or cold soak. Another rule is that the 2 point RE should be centered within RE_DR (i.e., [LE_lo(RE_DR)+RE_hi (RE_DR)]/2=[BF_lo(RE_DR)+BF_hi(RE_DR)]/2), although it may be desirable to put in provisions to skew the 2 point RE up or down. Lastly, it may be desirable to let Delta_BF_RE=constant. Equations describing the foregoing approach follow:

$$\text{Delta\_BF\_RE} = RE\_hi(RE\_DR) - LE\_lo(RE\_DR) \quad \text{Equation 45}$$

$$BF\_mid(RE\_DR) = [(BF\_lo(RE\_DR) + BF\_hi(RE\_DR)]/2 \quad \text{Equation 46}$$

Equations 7 and 8 are rewritten into the new general form:

$$BF\_RE\_\text{range} = BF\_hi(RE\_DR) - BF\_lo(RE\_DR)]/2 \quad \text{Equation 47}$$

In order to center LE_lo(RE_DR) and RE_hi(RE_DR) about BF_mid(RE_DR) and at the same time provide control variables to lower or raise LE_lo(RE_DR) and RE_hi(RE_DR), the following general form may be used:

$$LE\_lo(RE\_DR) = BF\_mid(RE\_DR) - BF\_RE\_\text{range}*f - \text{Lower\_LE\_lo} \quad \text{Equation 48}$$

$$RE\_hi(RE\_DR) = BF\_mid(RE\_DR) + BF\_RE\_\text{range}*f + \text{Raise\_RE\_hi} \quad \text{Equation 49}$$

'f' is a fraction between Low_f and High_f (Low_f and High_f derivation follows). Substituting Equations 48 and 49 into 45 yields:

$$\text{Delta\_BF\_RE} = BF\_RE\_\text{range}*2*f + \text{Raise\_RE\_hi} + \text{Lower\_LE\_lo} \quad \text{Equation 50}$$

From Equation 50 one can see that it would be unnecessary to have f>0.5 since at f=0.5, Delta_BF_RE will be larger than BF_RE_range, therefore:

$$\text{High\_}f = 0.5 \quad \text{Equation 51}$$

Low_f is established based on the rule of keeping the BF, when DR_initial is established via Section J, between LE_lo(RE_DR) and RE_hi(RE_DR). The limiting factor when setting Low_f is requiring LE_lo(RE_DR)<BF_lo switch(RE_DR). Note that maintaining RE_hi(RE_DR) above BF_hi_switch(RE_DR) is not a problem because Delta_BF_hi is always much larger than Delta_BF_lo based on the fact that BF is proportional to photon flux that varies exponentially with temperature. Derivation of Low_f follows:

During DR_initial setting from Equation 25:

$$BF\_lo\_\text{switch}(RE\_DR) = BF\_lo(RE\_DR) + \text{Delta\_BF\_lo}(DR) \quad \text{Equation 52}$$

The switching requirement, when f=Low_f, yields:

$$LE\_lo(RE\_DR) = BF\_lo\_\text{switch}(RE\_DR) \text{ for } RE\_DR > 0 \quad \text{Equation 53}$$

Plugging Equation 48 and 52 into 53 yields:

$$BF\_mid(RE\_DR) - BF\_RE\_\text{range}*\text{Low\_}f - \text{Lower\_LE\_lo} = BF\_lo(RE\_DR) + \text{Delta\_BF\_lo}(DR) \quad \text{Equation 54}$$

Plugging in Equation 46 into 54 and solving for Low_f yields:

$$\text{Low\_}f = \{[BF\_hi(RE\_DR) - BF\_lo(RE\_DR)]/2/ - \text{Lower\_LE\_lo} - \text{Delta\_BF\_lo}(DR)\}/BF\_RE\_\text{range} \quad \text{Equation 55}$$

Substituting BF_hi(RE_DR)−BF_lo(RE_DR)=BF_RE_range from Eqn. 47 yields:

$$\text{Low\_}f = (BF\_RE\_\text{range}/2 - \text{Delta\_BF\_lo}(DR) - \text{Lower\_LE\_lo})/BF\_RE\_\text{Range} \quad \text{Equation 56}$$

Note that Low_f is independent of BF_null changes because changes in BF_lo(RE_DR) and BF_hi(RE_DR) (due to BF_null varying from nominal design value) will cancel each other when calculating BF_RE_range. Unfortunately, changes in gain from the nominal design value would require a change to Low_f if LE_lo(RE_DR) were to be maintained at BF_lo_switch(RE_DR) in the middle values of RE_DR. Since it is desired to have low_f be a constant independent of gain changes, it is easier to perform the following algorithm:

If $LE\_lo(RE\_DR) < BF\_lo\_\text{switch}(RE\_DR)$ then $LE\_lo(RE\_DR) = BF\_lo\_\text{switch}(DR)$    Equation 57

Thus far the equations derived assumes that the full RE is performed under a cool or cold soak. Under warmer conditions, if LE_lo(0) (this should be the lowest target BF in the full RE calibration) is not achievable without sacrificing RE_hi(0), then it is possible to make provisions to increase LE_lo(0) by reducing or eliminating Lower LE_lo For RE_DR=0. Note that performance of the sensor would only be degraded at extreme cold (when DR=0 and BF during operation falls below LE_lo(0)). When conditions are cool enough during the full RE calibration, Lower_LE_lo may be increased to the desired value so that a better calibration (i.e., with the smaller LE_lo value) is possible. The conditions required to lower LE_lo(0) must be based on BF_cold which is the BF when the TRS is at its coldest. In other words, if BF_cold<LE_lo(0) then target is LE_lo(0) and if LE_lo(0)≦BF_cold ≦LE_lo(0)+Lower_LE_lo then the target is reset as follows: LE_lo(0)=BF_cold.

If on any RE_DR the TRS is required to go as cold as possible to achieve LE_lo(RE_DR), then BF_cold is reset. If the TRS does not go as cold as possible, then BF_cold may require approximation based on use of BF_cold obtained on a previous RE_DR and applying a correction factor due to changing optics temperature. When RE_DR>0, LE_lo(RE_DR) should maintain the Equation 48 value. When LE_lo(RE_DR)<BF_cold (if RE_DR=0 then use adjusted value of LE_lo(0) discussed in previous paragraph), then the detector gain (gain state or integration time) may be lowered if RE_hi(RE_DR) is not sacrificed. Limits placed on how hot the TRS may be driven to will limit how low the gain may be reduced to. In general, the low limit of integration time, called t_int_lo(RE_DR), is set as close as possible to the default DA_t_int for DR=RE_DR while the low limit of gain state, called gain_lo(RE_DR), is set as low as possible to achieve both LE_lo(RE_DR) and RE_hi(RE_DR). If lowering gain does not achieve LE_lo(RE_DR) without sacrificing RE_hi(RE_DR), then the RE calibration may be allowed further degradation where LE_lo(RE_DR) may be allowed to increase up to the BF established under hotter conditions (i.e., LE_lo(RE_DR)=Alt_LE_lo(RE_DR) where Alt_LE_lo(RE_DR) will be discussed herein after).

When there is a possibility that RE_hi(RE_DR) can not be reached because of TRS limitations, then it is necessary to flag for an alternate RE scheme (referred to as AltRE_flag, which equals 1 when the alternate scheme must be used). In the alternate scheme (AltRE_flag=1), LE_lo(RE_DR) is raised by a fixed amount (referred to as LE_lo_rise) for all RE_DR and then a lower DA_gain and/or DA_t_int limit as a function of RE_DR is established. At much higher soak temperatures, Alt_LE_lo(RE_DR) may not be achievable because of the integration time reduction limit (actual values above Alt_LE_lo(RE_DR) result and shall be referred to as Alt_LE_lo_increased (RE_DR)). Alt_RE_hi(RE_DR) remains the same as RE_hi(RE_DR) although the TRS maximum temperature limit may prevent achieving RE_hi(RE_DR) (actual values below Alt_RE_hi(RE_DR) result and shall be referred to as Alt_RE_hi_reduced(RE_DR)). The gain state and integration time limits (called Alt_gain_lo(RE_DR) and Alt_t_int_lo(RE_DR) respectively) should be established in a way that will allow the BF during LE initialization calibrations to be between Alt_LE_lo_increased(RE_DR) and Alt_RE_hi_reduced(RE_DR) as much as possible (note that LE initialization calibrations may not be at mid-BF (RE_DR) for reasons which will be discussed later in Section O). This relatively simple, yet flexible algorithm in terms of setting LE_lo(RE_DR), DA_gain and DA_t_int will allow for a calibration which is close to optimal (i.e., largest possible Delta_BF_RE) for the given ambient temperature. The only way to optimize the calibration further would be to set LE_lo(RE_DR), and the lower limits of DA_gain/DA_t_int as a complicated function of BF_cold. This may be unnecessarily complicated, and may not result in further significant optimization. The formulation of the alternate RE scheme is provided below:

$$Alt\_LE\_lo(RE\_DR) = LE\_lo(RE\_DR) + LE\_lo\_rise \quad \text{Equation 58}$$

Note that for the case that RE_DR=0 LE_lo(0) may have already been increased from the Equation 48 value by as much as Lower_LE_lo.

$$Alt\_RE\_hi(RE\_DR) = RE\_hi(RE\_{DR}) \quad \text{Equation 59}$$

BF_cold corresponding to the switching of AltRE_flag from 0 to 1, called AltRE_switch_BF, is calculated by using Equation 31 with replacement of Old_BF with LE_lo(RE_DR)+Allowed_error, New_BF with AltRE_switch_BF, New_gain with gain established when determining BF_cold and Old_gain with low gain limit when AltRE_flag=0:

$$Gain\_Ratio = (gain\ for\ BF\_cold)/(low\ gain\ limit\ for\ AltRE\_flag=0) \quad \text{Equation 60}$$

Note that gain refers to the total gain calculated by Equation 10.

$$Alt RE\_switch\_BF = (LE\_lo(RE\_DR) + Allowed\_error - BF\_null)*Gain\_Ratio + BF\_null$$

If BF_null is not known yet (i.e., before gain calibration), then BF_null must be set to minimize AltRE_switch_BF (i.e., if Gain_Ratio≧1, set BF_null to maximum value expected; otherwise, set BF_null to minimum value expected). Allowed_error is defined below as:

$$Allowed\_error = LE\_lo\_rise*(RE\_DR=0) + acceptable\ error \quad \text{Equation 62}$$

where (RE_DR=0)=1 if true, 0 if false.
Note that AltRE_switch_BF may change with every RE_DR.

Lastly, it is useful to consider warning the operator of the reduced quality of the full RE calibration (especially when AltRE_flag=1) so that a manual full RE may be attempted when the system is cool enough. Let's define the RE_quality factor as a number that varies between 0 (for worst full RE) to 1 (for best possible full RE) and may be calculated as follows:

$$RE\_quality = 1 - Max\_Delta\_inv*(BF\_cold - BF\_min) \quad \text{Equation 63}$$

Where BF_min=minimum value of target BF LE_lo(0) which occurs in a cold soak and Max_Delta_inv= weighting factor so that at the hottest soak temperatures RE_quality drops to near 0. Letting BF_cold=BF_hi(DR_max) and solving for Max_Delta_inv in Eqn. 63 yields:

$$Max\_Delta\_inv = 1/(BF\_hi(DR\_max) - BF\_min) \quad \text{Equation 64}$$

As a procedural safeguard, at power-up right before LE initialization, BF_cold can be determined and any possible improvement in RE_quality factor from rerunning the full RE calibration can be calculated (see Section O). If the original RE_quality factor is too low and the RE_quality factor can be improved significantly, then the RE_quality factor and its predicted improvement should be displayed to the pilot so that he can elect to do a manual full RE calibration if time permits.

In the preferred embodiment, the setting of LE_hi(RE_DR) and RE_hi(RE_DR) is limited by the TRS and the optics on ATFLIR. One problem is the ability of the TRS to go cold (limited by TRS_temp_min as discussed earlier). Another major factor is the maximum TRS temperature control limit of 75° C. Another minor factor is the maximum amount of power that can be delivered to the TRS (about 20 watts) which limits the ability to heat the TRS up to about the unpowered TRS temperature plus 82° C. The final factor is the low transmission of the optics on ATFLIR (about 0.45 if one does not include the TRS window or the dewar window). The effective system optics emissivity is assumed to be equal to 1-transmission. After modeling assuming a soak temperature of 29° C. or less when performing the full RE, it was found that a "f" value equal to Low_f was required when Lower_LE_lo and Raise_RE_hi equaled 0.015. Using Equation 56 yields Low_f=(0.45/0.2−0.06−0.015)/0.45=0.333 or 1/3.

Summary of equations (reiteration of Equations 46 through 49 with f=1/3 in Equations 48 and 49) for room ambient less than about 29° C. which are used in the gain calibration software algorithm to adjust LE_lo(RE_DR) and RE_hi(RE_DR) based on adjusted values of BF_lo(RE_DR) and BF_hi(RE_DR):

$$BF\_mid(RE\_DR) = [BF\_lo(RE\_DR) + BF\_hi(RE\_DR)]/2$$

$$BF\_RE\_range = BF\_hi(RE\_DR) - BF\_lo(RE\_DR)$$

$$LE\_lo(RE\_DR) = BF\_mid(RE\_DR) - BF\_RE\_range/3 - Lower\_LE\_lo$$

$$RE\_hi(RE\_DR) = BF\_mid(RE\_DR) + BF\_RE\_range/3 + Raise\_RE\_hi$$

Where Raise_RE_hi=Lower_LE_lo=0.015 (these control variables are kept very small for now). When RE_DR=0, Lower_LE_lo=0 if soak above about 25° C. and =0.015 if soak below about 17.3° C. Plugging in variable values in Equation 50 yields BF_RE_range=0.45*2/3+0.015+0.015=0.33. Delta_BF_RE is 73.3% of BF_RE_range (i.e., 0.733=0.33/0.45).

Table III is the summary of all the design defaults. The LE_lo and RE_hi final design defaults were from applying the equations above with the nominal design parameters of BF_lo, BF_hi, f, Raise_RE_hi and Lower_LE_lo. The remaining design defaults shown in Table III are BF_lo and BF_hi from previous table in Section I, BF_lo_switch and BF_hi_switch derived from Section J constants of Delta_BF_hi and Delta_BF_lo and applying Equations 24 and 25, default DA_gain, gain_val and DA_t_int for each DR from Sections A, C and F and the limits placed on DA_gain and DA_t_int during full RE calibration (gain_lo and t_int_lo respectively) which are derived after Table III.

TABLE III

Nominal Design

| | | | | |
|---|---|---|---|---|
| DA_t_int(DR)msec | 16.413 | 16.413 | 16.413 | 14.508 |
| DA_gain(DR) | 3 | 2 | 1 | 0 |
| Gain_val(DR) | 3.6 | 2.0 | 1.33 | 1 |
| DR | 0 | 1 | 2 | 3 |
| RE_DR[1] | 0 | 1 | 1 | 3 |
| BF_lo(DR) | 0.15 | 0.23 | 0.29 | 0.33 |
| LE_lo(RE_DR) | 0.225[2] | 0.29 | 0.29 | 0.39 |
| BF_lo_switch(DR)[3] | N/A | 0.29 | 0.35 | 0.39 |
| BF_hi_switch(DR)[3] | 0.485 | 0.505 | 0.565 | N/A |
| RE_hi(RE_DR) | 0.54 | 0.62 | 0.62 | 0.72 |
| BF_hi(DR) | 0.60 | 0.62 | 0.68 | 0.78 |
| t_int_lo(RE_DR)msec | 13.619 | 15.270 | 15.270 | 14.508 |
| gain_lo[4] | 0 | 0 | 0 | 1 |

Table III footnotes:
[1]Letting RE_DR = 3 without having RE_DR = 2 is the convention used for assigning numbers to RE_DR.
[2]This target value unlike other values of LE_lo, is with Lower_LE_lo = 0. Target may be reset as low as 0.21 (i.e., with Lower_LE_lo = 0.015 and BF_min = 0.21 in Equations 63 and 64) but soak temperature must be below about 17.3° C.
[3]BF_lo_switch(DR) and BF_hi_switch(DR) are approximate and are based on Delta_BF_hi = 0.115 and Delta_BF_lo = 0.06.
[4]DA_gain = 0 is gain state 0 and DR = 3 where gain_val(3) = 1, low limit is established when setting DR_initial.

The results in Table III (except for t_int_lo(RE_DR) and BF_lo_switch(DR)) appear in FIG. 3. BF_hi_switch(DR) is the same as the highest allowed BF for the first LE initialization calibration. Note that BF of DR_initial is within the 2 RE BF points (i.e., BF_lo_switch(DR)≧LE_lo(RE_DR) and BF_hi_switch(DR)<RE_hi(DR)) except at extreme hot and cold. The DA_t_int low limit for RE_DR=0 (t_int_lo(0)) was established based on the ability to achieve a BF always under the BF of the first LE calibration and also based on the ability to achieve RE_hi (0) even with the gain of RE_DR=DR=0 on the very high side (10% tolerance on gain so very high gain_val(0)= 1.1*3.6=3.96), the transmission on the low side (0.40 rather than 0.45) and the responsivity on the low side (40 mV/K rather than 43 mV/K). t_int_lo(1) was chosen so that when Alt_LE_lo(0) was achieved with t_int_lo(0), LE_lo(1) is automatically achieved when using t_int_lo(1) under the same worst case conditions as RE_DR=0, except with gain of DR2=2 on the high side (tighter tolerance of 7% may be expected so high gain_val(2)=1.07*1.33=1.4231) and gain of DR1=1 on the low side (tighter tolerance of 7% may be expected so low gain_val(1)=2.0/1.07=1.869). t_int_lo(3) is the default integration time for DR=3. The formulation when AltRE_flag=1 is shown below:

$$LE\_lo\_rise=0.03.$$

Therefore, Equation 58 becomes:

$$Alt\_LE\_lo(RE\_DR)=LE\_lo(RE\_DR)+0.03.$$

Remember that Alt_RE_hi(RE_DR) is the desired target which may not be achievable due to performing the full RE calibration during a hot soak. The BF achieved for the RE high calibration begins to result in unacceptable performance when it falls below the exact value of BF_hi_switch (RE_DR) (for RE_DR=0 BF_hi_switch(0)=0.4899 happens when soaked between 43° C. and 52.4° C.). Table IV summarizes the alternate RE scheme with Alt_LE_lo and Alt_RE_hi derived from applying Equations 58 and 59 with Table III defaults and with the new limits on gain and integration time (Alt_t_int_lo and Alt_gain_lo) which are derived thereafter.

TABLE IV

Alternative RE scheme

| | | | |
|---|---|---|---|
| RE_DR | 0 | 1 | 3 |
| Alt_LE_lo(RE_DR) | 0.255 | 0.32 | 0.42 |
| Alt_t_int_lo(RE_DR) | 7.651 | 7.905 | 9.936 |
| Alt_gain_lo(RE_DR) | 0 | 0 | 0 |
| Alt_RE_hi(RE_DR) | 0.54 | 0.62 | 0.72 |

Table IV Comments:
The targetBF of Alt_LE_lo(0) is achieved when soaked <47.1° C.
The targetBF of Alt_LE_lo(1) is achieved when soaked <53.0° C.
The targetBF of Alt_LE_lo(3) is achieved when soaked <58.3° C.
The targetBF of Alt_RE_hi(0) is achieved when soaked <37.8° C. Unacceptable RE_hi results if >43° C.
The targetBF of Alt_RE_hi(1) is achieved when soaked <42.3° C.
The targetBF of Alt_RE_hi(3) is achieved when soaked <49° C.

Alt_t_int_lo(RE_DR) values were chosen based on averaging the needs to achieve a BF during the LE initialization calibrations that was >Alt_LE_lo_increased(RE_DR) and <Alt_RE_hi_reduced(RE_DR) given nominal system parameters. The minimum LE calibration BF for DR=3 is 0.45 (0.45=(2*0.33+0.78)/3−0.03) which uses the RE_DR=3 set. With the FLIR soaked up to 60° C. during a full RE calibration (worst case) DA_t_int<9.175 msec is needed so that BF<0.45. In the LE calibrations the highest BF possible is 0.766, but the highest achievable RE_hi(3) value=0.72 and is achievable in the worst case full RE if DA_t_int>111.841 msec. Using a 2.5:1 weighted average in favor of achieving the low BF, Alt_t_int_lo(3)=9.936 msec was used (i.e., 9.936=(2.5*9.175+11.841)=3.5). For RE_DR=1, 4 possibilities were examined. In short; need >7.6508 msec (for DR=1 and BF>0.505=0.62−0.115) and need <7.7778 msec (for DR=2 and BF<0.39=(2*0.29+0.68)/3−0.03) to have first LE always <RE_hi(1) and >LE_lo(1). And, need >9.4286 msec (when DR=2 and BF>0.565=0.68−0.115) and <6.7619 msec (when DR=1 and BF<0.3332= 0.23+0.06+BF rise for 13° C. TRS rise) to have first LE always <RE_hi(1) and >LE_lo(1). Since all these conditions can't be met simultaneously, an average DA_t_int of 7.905 msec was used for Alt_t_int_lo(1) (i.e., 7.905= (7.6508+7.7778+9.4286+6.7619)/4). For RE_DR=0, 2 possibilities were examined. In short; need >8.667 msec so that the BF of the first LE always <RE_hi(0) (i.e., BF<0.4899). And, need <5.238 msec so that BF<0.2607 (0.2607=0.15+ 0.06+BF rise for 13° C. TRS rise). Taking a 2.5:1 weighted average in favor of high BF yields Alt_t_int_lo(0)=7.651 msec (i.e., 7.687=(2.5*8.667+5.238)/3.5 which rounds to the nearest DA_t_int LSB of 7.651 msec).

The AltRE_flag is set before the first LE_lo calibration (after choosing the initial gain state, setting DA_t_int to maximum of 16.413 msec and finding BF_cold) and again after the gain calibration has obtained an adjusted value of LE_lo(1). It isn't necessary to reset AltRE_flag for RE_DR=3. Before the gain calibration, RE_DR=0 and gain ratio Equation 60 with Table III value of DA_t_int default becomes gain_ratio=gain_val(DR)*16.413 msec/t_int_lo (0) which is always greater than 1 based on Table III values of t_int_lo(0) and gain_val(DR) (note that gain_val(DR) may be left out by setting DR=3 since based on Section M algorithm BF_cold is always low enough so that AltRE_flag=0 when DR<3). Because BF_null is not known before the gain calibration and gain_ratio is greater than 1, BF_null is set to the maximum expected value of 0.06 (and RE_DR=0) in AltRE_switch_BF Equation 61. In Equation 62 (which is plugged into Equation 61) the acceptable error is defined as 0.0041 (slightly less than 1 LSB of 0.005). Note that in general, software tolerance for achieving a BF varies from about half a LSB to 1.6 LSBs, but looser tolerances may be required to speed up the calibrations. After the gain calibration, RE_DR is changed to 1 and the known values of LE_lo(1) and BF_null are used in Equations 60, 61 and 62. Due to optics heating that will occur by the time RE_DR=1 is calibrated, BF_cold is increased by 0.01 (this is an educated guess). Remember that BF_cold is compared with AltRE_switch_BF when setting AltRE_flag.

The full RE software algorithm directly uses Equations 57 through 64. Equation 57 is part of the gain calibration for correcting LE_lo(RE_DR) if needed, Equations 58 and 59 provide determination of Alt_LE_lo and Alt_RE_hi from corrected values of LE_lo and RE_hi, Equations 60 through 62 is part of the full RE calibration regarding whether or not to use the alternate RE scheme and Equations 63 and 64 (with DR_max=3, BF_hi(3) in Table III, BF_min in footnote 2 of Table III and BF_cold found at initial part of full RE calibration per Section M algorithm) is part of the decision process regarding flagging the need for a full RE calibration. For now, the flagging of the pilot to redo the full RE calibration is recommended if the RE_quality factor is less than 0.85, the possible improvement in RE_quality factor is greater than 0.15 and the new RE_quality factor is at least 0.70. Based on this recommendation, a manual full RE calibration would at most be run two times.

M. Procedures for the Initial Part of Full RE Calibration Including Detector Gain State Calibration:

When there are multiple RE_DR, and assuming the FLIR optics heats up with time, it is desirable to first calibrate RE_DR with the lowest LE_lo(RE_DR) (RE_DR=0 is usually the case and is true in the preferred embodiment) after going as cold as possible with the TRS (this may be done during cooldown to save time since the TRS may take a while to reach its cold limit). The initial gain state for the RE calibration should be adjusted to achieve a BF<LE_lo (RE_DR=0)+acceptable error while at the default integration time for DR=RE_DR=0. It is desirable to start with the highest gain state and keep reducing the gain state (DA_gain) until BF<LE_lo(0)+acceptable error or the lowest gain state is reached. After the gain state is adjusted the final BF, BF_cold, is determined. If BF_cold<Alt_LE_lo(0)+ acceptable error is not achievable in the lowest gain state with the TRS at TRS_temp_min(° C.), then the integration time must be reduced. Then the LE_lo calibration may begin. The higher BF point RE_hi must be reached by heating up the TRS while keeping the same gain state and integration time. The only limitation in reaching the higher BF is in the TRS control electronics.

The best time to do the detector gain state calibration (or gain calibration for short) is as early as possible so that BF_lo(DR), BF_hi(DR), LE_lo(RE_DR), and RE_hi (RE_DR) and other BF variables may be readjusted before the full RE calibration takes place. Remember that the readjustment of these BF points were required so that the automatic DR adjustment (based on BF_hi(DR) and BF_lo (DR)) will have a consistent overlap between dynamic ranges.

The gain calibration is accomplished by obtaining the initial BF in each gain state while viewing the TRS, driving the TRS hot or cold and then obtaining the change in BF (Delta_BF) from the initial BF for each gain state. Using Equation 19 and Equation 10 with constant integration time, the gain relative to that seen in DR_max is:

$$\text{Gain\_val}(DR) = \text{Delta\_BF}(DR)/\text{Delta\_BF}(DR\_\text{max})$$

In Equations 65 through 82, BF(DR) refers to BF when DA_gain is set for DR but DA_t_int may not be set for DR.

In order to save time, the gain calibration can occur right after the first LE low calibration. This way the BF is already starting out low which is required to prevent saturation when going to higher gain (integration time may still have to be temporarily reduced to prevent saturation). Also, the TRS must then be driven hot for the gain calibration, which is consistent with what needs to be done to perform the RE high calibration.

It is important not to raise the TRS temperature too high during the gain calibration (corresponds to a rise in BF, BF_rise, when in the lowest gain corresponding to DR_max) for two reasons: 1. When integration time and gain state are switched back to the value used in the LE_lo calibration the BF will not exceed RE_hi(0) (i.e., otherwise the full RE calibration will take longer). 2. Excessive integration time reduction would be required to prevent saturation (this is only a problem if the FPA gain state is affected by large changes in integration time). The integration time required to prevent saturation during the gain calibration may be accomplished in one step (account for BF_rise and gain change at one time) or in two steps (Step 1. find integration time needed for higher gain Step 2. Find integration time to account for BF_rise after gain change).

In the one step method to reduce integration time to prevent saturation: Use Equation 21, with initial BF in lowest gain, BF=BF(DR1=DR_max) increased by BF_rise (so BF after TRS temperature rise=BF(DR_max)+BF_rise) and along with DR2=0 (this is the DR with the highest gain which produces the highest BF in the gain calibration), yields:

$$BF(0) = (BF(DR\_\text{max}) + BF\_\text{rise} - BF\_\text{null}) * \text{gain\_ratio} + BF\_\text{null} \quad \text{Equation 66}$$

And, use Eqn. 18, Eqn. 10 with constant DA_t_int and then use Eqn. 6 yielding:

$$\text{gain\_ratio} = \text{gain\_val}(0)/\text{gain\_val}(DR\_\text{max}) = \text{gain\_}(0) \quad \text{Equation 67}$$

Plugging Eqn. 67 into Eqn. 66 and solving for BF(DR_max) in Eqn. 66 yields:

$$BF(DR\_\text{max}) = (BF(0) - BF\_\text{null}/\text{gain\_val}(0) - BF\_\text{rise} + BF\_\text{null} \quad \text{Equation 68}$$

To prevent saturation, $BF(0) \leq BF\_hi(DR\_\text{max})$, and to find minimum integration time reduction needed at the point nearest saturation:

$$BF(0) = BF\_hi(DR\_\text{max}) \quad \text{Equation 69}$$

Plugging Equation 69 into 68 yields:

$$BF(DR\_\text{max}) = (BF\_hi(DR\_\text{max}) - BF\_\text{null})/\text{gain\_val}(0) - BF\_\text{rise} + BF\_\text{null} \quad \text{Equation 70}$$

To prevent saturation when DR is switched to 0, BF(DR_max) must be minimized with respect to the unknown quantity gain_val(0) and BF_null. BF(DR_max) is minimized when BF_null is at a minimum (BF_null_min) and gain_val(0) is maximized (i.e., gain_val_max(0)) thus yielding:

$$BF(DR\_\text{max}) = (BF\_hi(DR\_\text{max}) - BF\_\text{null\_min})/\text{gain\_val\_max}(0) - BF\_\text{rise} + BF\_\text{null\_min} \quad \text{Equation 71}$$

Equation 71 is the desired target BF to be achieved by reducing the integration time (before changing gain or heating TRS).

In the two step method to reduce integration time to prevent saturation: Step 1) Equation 71 is the same except set BF_rise=0 (i.e., first change gain only with TRS_temp= constant):

$$BF(DR\_max)=(BF\_hi(DR\_max)-BF\_null\_min)/gain\_val\_max(0)+BF\_null\_min \quad \text{Equation 72}$$

Equation 72 is the target BF one wishes to achieve by reducing the integration time. Since the integration time needs to change again, one may wish to let gain_val_max= default gain_val(0) as long as major saturation does not result. This may be desired in order to prevent the need to change integration time twice (i.e., BF may be already low enough without the first integration time change). Per above arguments, Equation 72 becomes:

$$BF(DR\_max)=(BF\_hi(DR\_max)-BF\_null\_min)/gain\_val(0)+BF\_null\_min \quad \text{Equation 72a}$$

Then, Step 2); first, it is necessary to distinguish the initial BF (before TRS heats up) from the final BF (after TRS heats up) when DR=0, so in Equation 66 let BF(0)=BF_final(0) yielding:

$$BF\_final(0)=(BF(DR\_max)+BF\_rise-BF\_null)*gain\_ratio+BF\_null \quad \text{Equation 73}$$

Setting BF(0)=BF_init(0) and BF_rise=0 into Equation 68 (i.e., change gain and not TRS temperature) yields:

$$BF(DR\_max)=(BF\_init(0)-BF\_null)/gain\_ratio+BF\_null \quad \text{Equation 74}$$

Plugging Equation 74 into 73 eliminates BF_null and yields:

$$BF\_final(0)=BF\_init(0)+BF\_rise*gain\_ratio \quad \text{Equation 75}$$

Solving for BF_init(0) in Equation 75 yields:

$$BF\_init(0)=BF\_final(0)-BF\_rise*gain\_ratio \quad \text{Equation 76}$$

To prevent saturation, let:

$$BF\_final(0)=BF\_hi(DR\_max) \quad \text{Equation 77}$$

Plugging Equation 77 into Equation 66 yields:

$$BF\_init(0)=BF\_hi(DR\_max)-BF\_rise*gain\_ratio \quad \text{Equation 78}$$

To prevent saturation when TRS is heated up, BF_init(0) must be minimized with respect to the unknown quantity gain_ratio. BF_init(0) is minimized when gain_ratio is maximum (gain_ratio=gain_ratio_max=gain_val_max(0)):

$$BF\_init(0)=BF\_hi(DR\_max)-BF\_rise*gain\_val\_max(0) \quad \text{Equation 79}$$

Equation 79 is the desired target BF to be achieved by reducing the integration time (before TRS heats up).

By monitoring BF as DA_t_int is changed with a constant gain state, a routine to reduce integration time, to reach targetBF (with integration time at DA_t_int final) can be developed. Use Equation 30 with New_gain/Old_gain=DA_t_int_final/DA_t_int (from Equation 10 and simplification from constant gain state), New_BF=targetBF and Old_BF=BF.

Solve for DA_t_int final yielding:

$$DA\_t\_int\_final=DA\_t\_int*(targetBF-BF\_null)/(BF-BF\_null) \quad \text{Equation 80}$$

Even though BF_null is not known, a routine can be set-up using Equation 80 where BF_null is set to 0, yielding:

$$DA\_t\_int\_final=DA\_t\_int*targetBF/BF \quad \text{Equation 80a}$$

In the Equation 80a routine, DA_t_int_final is calculated knowing BF for a given DA_t_int, DA_t_int is reset in the FLIR to the calculated DA_t_int_final value (rounded to the, nearest LSB) and the process is repeated until the change in BF is less than half of a DA_t_int LSB.

Let's examine two sources of error: 1. measurement error 2. % deviation from nominal Gain_val(DR). Both sources of error should be monitored in the gain calibration. To monitor measurement error, the BF (or better yet filtered BF) should be obtained twice (BF1 and BF2) and the average reading should be used when calculating gain_val(k). The BF error equals about half of the delta between the 2 BF readings:

$$BF\_error=ABS(BF2-BF1)/2$$

To understand the sources of error, first rewrite Equation 65 as:

$$Gain\_val(k)=[BF\_final(k)-BF\_init(k)]/[BF\_final(DR\_max)-BF\_init(DR\_max)] \quad \text{Equation 65a}$$

Let the % design tolerance on Gain_val(k) be denoted by 100%*Gain_tol and the expected % measurement accuracy on the value of gain_val(DR) is 100%*BF_tolerance. The maximum % deviation from nominal Gain_val(k) is provided in Equation 81a below.

$$Gain\_val\_max\_\%\_deviation=(BF\_tolerance+Gain\_tol)*100\% \quad \text{Equation 81a}$$

If during the calibration the Equation 65a value of Gain_val(k) deviates from the nominal design value by more than the percentage calculated in Equation 81a, then the hardware should be suspect.

The allowed measurement error in BF may be calculated as follows:

From Equation 76 and as a first approximation let gain_ratio(k)=default gain_val(k):

$$BF\_final(k)-BF\_init(k)=BF\_rise*gain\_val(k) \quad \text{Equation 82}$$

The total measurement percentage error of gain_val(k) from Equation 65a is approximately the RSS of the percentage error of the numerator and denominator and if it is assumed equal error for the numerator and denominator then percentage error of numerator equals percentage error of denominator, which equals total percentage error/$2^{1/2}$.
Define BF_tolerance=total%error/100% yielding:

$$\% \text{ error in numerator}=\text{total }\%\text{ error}/2^{1/2}=100\%*BF\_tolerance/2^{1/2} \quad \text{Equation 83}$$

Based on RSS %error in Equation 82:

$$\% \text{ error in numerator}=100\%2^{1/2}*BF\_error/[BF\_rise*gain\_ratio(k)] \quad \text{Equation 84}$$

Setting Equation 84 equal to Equation 83 and solving for BF_error yields:

$$BF\_error=BF\_tolerance*BF\_rise*gain\_ratio(k)/2 \quad \text{Equation 85}$$

Plugging Eqn. 81 into 85 yields:

$$ABS(BF2-BF1)=BF\_tolerance*BF\_rise*gain\_ratio(k) \quad \text{Equation 86}$$

Equation 86 defines the maximum measured error allowed. If during the calibration the error ABS(BF2−BF1) exceeds the Equation 86 value, then either the hardware is suspect or the value of BF_rise should be increased.

BF_null is solved as follows:

Use Equation 18a and 6 with DR2=DR_max, DR1=I and DA_t_int(DR2)=DA_t_int(DR1) to solve for Gain_ratio:

$$\text{Gain\_ratio} = 1/\text{Gain\_val}(I) \quad \text{Equation 87}$$

Plugging Equation 87 into Equation 21, letting DR1=I and DR2=DR_max and solving for BF_null yields:

$$BF\_null = [BF(DR\_max)*gain\_val(I) - BF(I)]/[gain\_val(I) - 1]$$

where I=0, or 1 or . . . , DR_max−1

The value obtained for BF_null in Equation 88 is checked against the expected nominal design value and deviations greater than expected may be flagged to signal a possible hardware problem.

Knowing the actual values of gain_val(DR) (i.e., hardware measured values as opposed to nominal design values) from Equation 65a, one can calculate Gain_ratio(DR) which is defined in Equation 34 in section K as actual_gain_val(DR)/nominal_gain_val(DR). Knowing Gain_ratio(DR) from Equations 65a and 34 and BF_null from Equation 88 allows the readjustment of all other BF related parameters in section K.

In the preferred embodiment ATFLIR, the procedures described for RE and gain calibration are to be utilized. The following equations are used in the gain calibration: Equation 72a (with BF_null_min=0) and Equation 79 (with gain_val_max(0)=(1+Gain_tol)*gain_val(0), Gain_tol=0.10, gain_val(0) from Table III and BF_rise=0.025) of the 2 step method are used to find the targetBF when resetting integration time for the gain calibration. Equation 80a is used as a routine in the integration time or BF reduction subroutine in order to reset the integration time (based on targetBF). Equation 86 with BF_tolerance=0.02 and BF_rise=0.025 is used to judge whether the calibration was accurate enough and whether the hardware is performing properly. Equation 81a criteria for maximum deviation from the Table III value of gain_val(DR) with Gain_tol=0.10 and BF_tolerance=0.02 is followed to check whether or not the hardware is performing properly (early on Equation 81a may be used to reset BF_rise). And the most important part of this section to be used in the gain calibration, Equation 88 is used to measure BF_null and Equation 65a is used to measure gain_val(DR) for all DR. Gain_ratio(DR) calculated from Equations 65a and 34 and BF_null from Equation 88 are then used to readjust all other BF related parameters in section K.

N. Automatic Dynamic Range Adjustment:

After the initial dynamic range (DR_initial) is chosen (based on algorithms in section O at the end of LE initialization), dynamic ranges are automatically switched as needed. When BF_hi(DR) is exceeded, the dynamic range will be switched to DR+1. When BF drops below BF_lo(DR), the dynamic range will be switched to DR−1. The algorithm must make sure that the DR to be switched to had the LE calibration. It may be desirable to prevent DR switching when under certain modes (like when tracking objects with FLIR). Of course, the pod can not be switched to DR less than 0 or greater than DR_max. Also, when switching DR (i.e., change DA_gain and possibly DA_t_int), the proper RE set for the DR must be selected. Note that BF may slightly exceed the range set by the two BF points of the RE calibration (if the RE range is limited). This fact would cause some performance degradation (increased fixed pattern noise), but would also increase the temperature range of each dynamic range thereby reducing how often the DR needed changing.

Overlap between dynamic ranges will prevent jumping back to the initial dynamic range after the initial dynamic range is changed. The only other technique to prevent constant DR switching is employing a large amount of filtering of the BF so that momentary changes in the scene will not immediately cause the dynamic range to switch to an adjacent dynamic range. Filtering may be done using weighted averages over a reasonably large time period (refer to as filter_time—recommend from 5 to 30 seconds). The filtered BF value (refer to as BF_slow_filter) should also be accessed at a period which is on the order of filter_time (one may elect to access the filtered BF less often if desired).

$$BF\_slow\_filter = (BF\_Filter*BF\_slow\_filter + BF)/(BF\_Filter\_wt + 1) \quad \text{Equation 89}$$

$$\text{Where filter\_time} = (1 + BF\_Filter\_wt)/BF\_Update\_Rate. \quad \text{Equation 90}$$

In the preferred embodiment ATFLIR, BF_Filter_wt=300 as a default and BF_Update_Rate=30 Hz, so filter_time=10.033 sec, BF_Filter_wt will be accessed every 20 seconds.

O. Initialization Procedures and Choosing BF Algorithm for LE Calibration:

The general LE initialization design below attempts to calibrate as many LE sets as possible (as allowed by optics temperature and TRS temp_min) and as quickly as possible. Other algorithms are possible but are most likely slower.

Pre-calibration
  Verifies that automatic fall RE does not need to be performed (based on monitoring serial number of sensor and applicable electronic boards and checking last RE_quality) Initialize variables including TRS_temp_initial, Optics_temp_initial During SDA cooldown, go cold with TRS to achieve TRS_temp_min (this is done because it usually takes longer for the TRS to go cold than hot).
  Limit the coldest absolute temperature the TRS needs to be (the starting BF when DR=0 for a nominal system should always be greater than BF_lo(0) even under an extreme cold soak).

$1^{st}$ LE initialization calibration (cal for short in algorithm below):
  Once TRS reaches its set point temperature and FLIR is ready then FLIR views TRS and determines DR_initial per section J.
  What happens next depends on BF relative to Min_BF (formulated in Eqn. 91 below)
  If BF>Min_BF(DR_initial) then do cal
  if BF<Min_BF(DR_initial) then
    if DR_initial≦DR_max−#LE sets+1 then achieve Min_BF by heating TRS & do cal
    if DR_initial>DR_max−#LE sets+1 then skip $1^{st}$ cal $2^{nd}$ LE initialization cal:
  If DR_initial<DR_max, change DR to DR_initial+1 (unless $1^{st}$ cal was skipped).
  Raise TRS temperature until BF=BF_mid(DR)=(BF_hi(DR)+BF_lo(DR))/2 or Min_BF to limit how much TRS must be slewed (as determined below)
  If BF_mid(DR)−BF(DR)>Max_delta(DR) then targetBF of $2^{nd}$ LE=Min_BF.
  Do cal.

$n^{th}$ LE initialization cal (where n>2 and n≦#LE sets):
  If $1^{st}$ cal not skipped & DR_initial+n−2<DR_max, change DR to DR_initial+n−1
  If $1^{st}$ cal skipped & DR_initial+n−3<DR_max, change DR to DR_initial+n−2

Raise TRS temperature until BF=Min_BF with altRE_flag set to 0 (limits TRS slewing).

Do cal.

Note that calibrating toward lower bucket fill saves time and places the calibration in a regime that one would expect to be needed more often (i.e., when switching to a higher dynamic range the bucket fill will first be at the low end of the dynamic range.

Formulation:

$$Min\_BF=(BF\_hi(DR)+g*BF\_lo(DR))/(1+g)-LE\_lo\_rise*(1-AltRE\_flag) \quad \text{Equation 91}$$

where g=1 (ideal if time was not a factor) to g_max. g_max=a value which will cause Min_BF to be equal to LE_lo(RE_DR) when f=Low_f. To solve for g_max:

$$BF\_lo\cdot switch(DR)=(BF\_hi(DR)+g\_max*BF\_lo(DR))/(1+g\_max)-LE\_lo\_rise \quad \text{Equation 92}$$

Substitute Equation 52 (BF_lo_switch(DR)=BF_lo(DR)+Delta_BF_lo(DR)) into Equation 92 and solve for g_max yielding:

$$g\_max=(BF\_hi(DR)-BF\_lo(DR))/(BF\_Delta\_lo(DR)+LE\_lo\_rise)-1 \quad \text{Equation 93}$$

Equation 93 must be satisfied for all DR.

After the last LE initialization calibration, the TRS is held at its present command position (TRS_SETPT) a little longer to guarantee extra stability then the blinker detection calibration is performed. The blinker detection calibration adds excessively noisy pixels to the pixel substitution map.

Lastly, DR_initial is chosen to be the DR calibrated when the TRS temperature was closest to the best guess scene temperature, DR_set_temp (guessing is required because the FLIR is not allowed to move gimbals to view the scene during initialization). Optionally, one can wait until a scene is viewed and apply the algorithms of section J. As another alternative, the pod can stay at its present DR (chosen at the last LE initialization calibration) and let the automatic range adjustment algorithm of section N switch to the proper dynamic range.

In general, DR_set_temp is equal to some initial temperature unless the initial temperature is very hot or cold. If the initial temperature is too hot, then the scene temperature is assumed to be less. If the initial temperature is too cold, then raise DR_set_temp to a value that one would expect the FLIR to see (in terms of BF) sometime later (due to optics self heating). Linear equations may be used to change DR_set_temp for the hot and cold extremes.

In the preferred embodiment, the EOSU and D-NUC serial numbers are monitored by the PC to see if either had been changed which is the flag to perform a full RE calibration before LE initialization. The TRS is not allowed to go below −10° C. in the pre-calibration phase. The TRS is heated 14° C. if BF<Min_BF at the 1st calibration. In Equation 91, BF_lo and BF_hi are the gain calibration adjusted BF values, AltRE_flag is the value (0 or 1) set in the full RE calibration, LE_lo rise=0.03 and g=2 ("g" could have been as large as 3.333 for the condition that DR=1 in Eqn. 91—i.e., 3.333=(0.62−0.23)/(0.06+0.03)−1). With g=2, the 2nd LE initialization calibration is above LE_lo(1) as long as the full RE calibration was done with a soak temperature less than 57.2° C.

In the algorithm for determining the targetBF for the 2nd LE calibration, Max_delta(DR)=0.22−(DR>1)*0.03 where (DR>1)=1 if true, =0 if false. In setting DR after LE initialization, the following algorithms are used for DR_set_temp:

DR_set_temp(° C.)=(Optics_temp_initial(K)−273.15K)*1° C./K if DR_set_temp>35° C. then DR_set_temp=42° C.+(DR_set_temp−71° C.)/5 if DR_set_temp<3° C. then DR_set_temp=−11.5° C.+(DR_set_temp+40° C.)/3

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A method of calibrating pixel gain level sets, according to output bucket fill levels, for a plurality of dynamic range maps at a first gain state during an initialization procedure in a video signal of a staring FLIR having a sensor to provide uniform display characteristics over time with varying scene and optics temperatures, comprising the steps of:

performing a plurality of a pairs of responsivity equalization calibrations, corresponding to defined high and low bucket fill levels centered about each of said plurality of dynamic range maps, to produce sets of pixel gain correction values, and performing a plurality of level equalization set calibrations, during a subsequent initialization procedure, that produces pixel gain value bucket fill levels falling within said defined bucket fill levels of the corresponding responsivity equalization calibration.

2. The method of claim 1 further comprising the step of switching from a first dynamic range map and its associated calibration sets to a second dynamic range map and its associated calibration sets during operation of the staring FLIR when scene and optics temperature changes cause the bucket fill levels output by said first dynamic range to exceed said defined high or low bucket fill levels.

3. The method of claim 1 wherein adjacent high and low bucket fill levels of said first and said second dynamic range maps overlap, thereby providing a hysteresis effect against dynamic range map switching.

4. The method of claim 2 wherein said switching step is occurs automatically.

5. The method of claim 4 adapted to center the range of calibrations, useful when the low and high bucket fill levels of a given responsivity equalization calibration span the majority of the corresponding dynamic range map, the method further comprising the steps of:

defining, during a one-time initialization period, a plurality of sensor dynamic ranges as a low and a high bucket fill values for a given gain state, based on at least one of: the number of dynamic ranges; the gain settings of each dynamic range; the expected temperature range of scene and optics; the optics emissivity; the optical gain; or the requirement to provide proper scene temperature overlap between adjacent dynamic ranges; refining the calibration of said given gain state, based on one-half of the scene temperature overlap between adjacent dynamic ranges, as low and high bucket fill level switching points for each dynamic range that was used in the level equalization calibration;

defining, in a gain calibration process, a pair of bucket fill levels for each responsivity equalization calibration that is centered in the corresponding dynamic range, and, is separated such that the bucket fill of a first level equalization leis between the low and high bucket fill levels of a corresponding responsivity equalization calibration; and performing a plurality of pairs of responsivity equalization calibrations to cover said plurality of dynamic ranges.

6. The method of claim 5 wherein an initialization process further comprising the steps of:

aligning the entrance pupil of the staring FLIR with a thermal reference source;

driving the thermal reference source to a low thermal level;

adjusting the integration time of the sensor to prevent saturation in the highest gain state;

monitoring the bucket fill level for each gain state before and after heating the thermal reference source, wherein the theoretical bucket fill corresponds to no photon flux and the gain of each gain state is calculated and used to calculate all of said pairs of bucket fill levels;

aligning the entrance pupil of the FLIR to the thermal reference source, for each pair of responsivity equalization calibrations, and driving the thermal reference source to a low thermal level;

adjusting the gain to match the low responsivity equalization bucket fill level, limited to the lowest gain;

performing a level equalization calibration and driving the thermal reference to a high thermal level matching a high bucket fill point, then performing the RE calibration; and repeating said pair of responsivity equalization calibrations for successively higher dynamic ranges, given the assumption that the optics are heating with time.

7. The method of claim 6 adapted for the case where the span from low to high bucket fill levels can not be achieved due to hardware and physical constraints, further comprising the steps of:

reducing the span, while holding said centered relationship, of each two point responsivity equalization calibrations and allowing for greater gain reduction in order to achieve the reduced span.

8. The method in claim 1 further comprising the steps of:

performing said calibrations in order from the coldest dynamic range map to the hottest dynamic range map;

driving a thermal reference source to a low temperature during cooldown of the detector;

performing a gain calibration immediately after the low calibration on the coldest dynamic range of said plurality of level equalizations; and skewing the bucket fill levels lower on higher dynamic ranges during said level equalization calibrations.

9. A system for calibrating pixel gain level sets, according to output bucket fill levels, for a plurality of dynamic range maps at a first gain state during an initialization procedure in a video signal of a staring FLIR having a sensor to provide uniform display characteristics over time with varying scene and optics temperatures, comprising:

means for performing a plurality of a pairs of responsivity equalization calibrations, corresponding to defined high and low bucket fill levels centered about each of said plurality of dynamic range maps, to produce sets of pixel gain correction values and means for performing a plurality of level equalization set calibrations, during a subsequent initialization procedure, that produces pixel gain value bucket fill levels falling within said defined bucket fill levels of the corresponding responsivity equalization calibration.

* * * * *

UNITED STATES PATENT AND TRADEMARK OFFICE
CERTIFICATE OF CORRECTION

PATENT NO. : 6,737,639 B2
DATED : May 18, 2004
INVENTOR(S) : Lee J. Huniu

It is certified that error appears in the above-identified patent and that said Letters Patent is hereby corrected as shown below:

Column 1,
Line 4, please insert the following -- This invention was made with Government support under subcontract No. E80011 (The Boeing Company), through its corresponding prime contract No. N00019-97-C-0009, which was awarded by the Department of the Navy. The Government has certain rights in this invention. --

Signed and Sealed this

Twenty-second Day of March, 2005

JON W. DUDAS
*Director of the United States Patent and Trademark Office*